United States Patent
Bai et al.

(10) Patent No.: US 9,767,392 B2
(45) Date of Patent: Sep. 19, 2017

(54) METHOD AND SYSTEM FOR RENDERING RECTANGLE DRAWING OBJECTS USING ONE-LINE RASTER IMAGE DATA

(71) Applicant: KYOCERA Document Solutions Inc., Osaka (JP)

(72) Inventors: Xuqiang Bai, Rancho Palos Verdes, CA (US); Hideo Nakahara, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 29 days.

(21) Appl. No.: 14/923,924

(22) Filed: Oct. 27, 2015

(65) Prior Publication Data

US 2016/0350949 A1    Dec. 1, 2016

Related U.S. Application Data

(60) Provisional application No. 62/167,259, filed on May 27, 2015.

(51) Int. Cl.
*G06K 15/02* (2006.01)
*G06F 3/12* (2006.01)
(Continued)

(52) U.S. Cl.
CPC .......... *G06K 15/00* (2013.01); *G06F 3/1208* (2013.01); *G06F 3/1215* (2013.01); *G06F 3/1242* (2013.01); *G06F 3/1247* (2013.01); *G06K 15/1817* (2013.01); *G06K 15/1836* (2013.01); *G06K 15/1849* (2013.01); *G06K 15/1856* (2013.01); *G06T 11/20* (2013.01); *G06T 11/203* (2013.01); *G06T 11/40* (2013.01); *G06K 2215/0062* (2013.01)

(58) Field of Classification Search
None
See application file for complete search history.

(56) References Cited

U.S. PATENT DOCUMENTS 5,315,691 A * 5/1994 Sumiya ................. G06F 3/1297
                                                   358/1.13
8,194,271 B2   6/2012 Nakahara
(Continued)

FOREIGN PATENT DOCUMENTS

JP    2007026285 A    2/2007

*Primary Examiner* — Scott A Rogers
(74) *Attorney, Agent, or Firm* — McDonnell Boehnen Hulbert & Berghoff LLP

(57) ABSTRACT

A method and system for rendering rectangle drawing objects are provided. For at least a first rectangle drawing object and a second rectangle drawing object, a determination is made if the second rectangle drawing object satisfies a predetermined condition with respect to the first rectangle drawing object. If the predetermined condition is satisfied, one-line raster image data associated with the second rectangle drawing object is generated and stored in a data buffer. The one-line raster image data indicates a filling color of the second rectangle drawing object over a first extent in a first direction. Subsequently, the one-line raster image data may be used a number of times over a second extent in a second direction perpendicular to the first direction to fill a drawing region corresponding to at least the second rectangle drawing object.

26 Claims, 25 Drawing Sheets

(51) Int. Cl.
*G06T 11/20* (2006.01)
*G06T 11/40* (2006.01)
*G06K 15/00* (2006.01)

(56) References Cited

U.S. PATENT DOCUMENTS

| | | | |
|---|---|---|---|
| 8,520,243 B2 | 8/2013 | Nakahara | |
| 8,810,847 B2 * | 8/2014 | Ito | G06F 3/1208 |
| | | | 358/1.1 |
| 9,047,554 B2 * | 6/2015 | Hirano | G06K 15/1872 |
| 2006/0028701 A1 | 2/2006 | Suzuki | |
| 2009/0103139 A1 | 4/2009 | Ozawa | |
| 2010/0134509 A1 * | 6/2010 | Matsuo | G06T 11/40 |
| | | | 345/581 |
| 2010/0309489 A1 * | 12/2010 | Bailey | G06K 15/105 |
| | | | 358/1.5 |
| 2013/0188200 A1 | 7/2013 | Nakahara | |
| 2013/0286422 A1 | 10/2013 | Hirano | |
| 2016/0350949 A1 * | 12/2016 | Bai | G06T 1/20 |

* cited by examiner

N RECTANGLE DRAWING OBJECTS
NEED N TIMES OF RECTANGLE FILLING COLOR
SETUP AND ORDER GENERATION

ONE-LINE RASTER IMAGE NEEDS ONLY ONE
ORDER GENERATION

CURRENT RECTANGLE OBTAINED BY MERGING RECTANGLES (1) AND (2)

CURRENTLY RENDERED ONE-LINE RASTER IMAGE

INCOMING RECTANGLE (3)

CURRENT RECTANGLE OVERLAPPED BY COMING RECTANGLE (3)

CURRENTLY RENDERED ONE-LINE RASTER IMAGE

CURRENT RECTANGLE OBTAINED BY MERGING RECTANGLES (1), (2) AND (3)

METHOD AND SYSTEM FOR RENDERING RECTANGLE DRAWING OBJECTS USING ONE-LINE RASTER IMAGE DATA

CROSS REFERENCE TO RELATED APPLICATIONS

The present application claims priority to U.S. Provisional Application Ser. No. 62/167,259, filed on May 27, 2015, which is incorporated by reference herein in its entirety.

BACKGROUND

The present invention generally relates to a method of rendering drawing objects in print data. More particularly, print data may contain data representing various drawing objects having different shapes that are used to form a final output image. One example of such drawing object is a drawing object having a shape of a rectangle. As used herein, a drawing object having a shape of a rectangle will be termed as a "rectangle drawing object." In this regard, based on the print data, multiple rectangle drawing objects (e.g., a sequence of rectangle drawing objects) may need to be rendered. One example of rendering of multiple rectangle drawing objects is the case of forming a non-uniform background of the final output image.

Typically, each rectangle drawing object in the print data will have a corresponding filling color that fills a rectangle drawing object (or, in other words, a "rectangle filling color"). One traditional method of rendering a rectangle drawing object is to generate rectangle orders (or printing commands), and to set a rectangle filling color for every single rectangle. FIG. 1 depicts an example of a related art workflow for drawing a rectangle object.

As shown in FIG. 1, at step 10, rendering of rectangle drawing object starts. At step 12, a rectangle filling color is set. Then, at step 14, rectangle parameters are set (e.g., a width and a height of the rectangle are set). At step 16, rectangle orders are generated and, at step 18, the rendering of rectangle drawing object ends.

As noted above, the above-described process is traditionally carried out for each single rectangle drawing object in a plurality of rectangle drawing objects to be rendered. Hence, when many drawing objects exist, the rectangle order generation and filling color setup will take time and cause printing speed performance to slow down.

SUMMARY

In light of the above, the present disclosure provides a way to improve drawing time for rectangle drawing objects that meet a certain condition.

More specifically, in one aspect, a disclosed method for rendering rectangle drawing objects comprises: (i) receiving print data including data representing a plurality of rectangle drawing objects, the plurality of rectangle drawing objects including at least a first rectangle drawing object and a second rectangle drawing object, (ii) determining if the second rectangle drawing object satisfies a predetermined condition with respect to the first rectangle drawing object, (iii) if the predetermined condition is satisfied, generating one-line raster image data associated with the second rectangle drawing object and storing the one-line raster image data in a data buffer, wherein the one-line raster image data indicates a filling color of the second rectangle drawing object over a first extent in a first direction, the first extent corresponding to a first parameter of the second rectangle drawing object, and (iii) using the one-line raster image data a number of times over a second extent in a second direction perpendicular to the first direction to fill a drawing region corresponding to at least the second rectangle drawing object, the second extent corresponding to a second parameter of the second rectangle drawing object.

The disclosed method may further comprise: (i) prior to determining if the second rectangle drawing object satisfies the predetermined condition with respect to the first rectangle drawing object, generating a first one-line raster image data associated with the first rectangle drawing object and storing the first one-line raster image data in the data buffer, wherein the first one-line raster image data indicates a filling color of the first rectangle drawing object over a third extent in the first direction, the third extent corresponding to a third parameter of the first rectangle drawing object, and the first rectangle drawing object having a fourth parameter extending in the second direction, and (ii) merging the one-line raster image data associated with the second rectangle drawing object with the first one-line raster image data in the data buffer to generate a merged one-line raster image data associated with the first and second rectangle drawing objects, wherein the fourth parameter of the first rectangle drawing is equal to the second parameter of the second rectangle drawing object.

In one embodiment, the first direction is defined as a horizontal direction, the second direction is defined as a vertical direction, the first parameter is defined as a width, the width extending in the horizontal direction, and the second parameter is defined as a height, the height extending in the vertical direction. When the first direction is defined by a first axis and the second direction is defined by a second axis orthogonal to the first axis, the predetermined condition holds that: (i) the first and second rectangle drawing objects are parallel with the first axis, (ii) a position of the second rectangle drawing object along the second axis is the same as a position of the first rectangle drawing object along the second axis, (iii) a height of the second rectangle drawing object is equal to a height of the first rectangle drawing object, and (iv) in the first direction, (a) the second rectangle drawing object is connected to the first rectangle drawing object or (b) the second rectangle drawing object overlaps first rectangle drawing object.

In another embodiment, the first direction is defined as a vertical direction, the second direction is defined as a horizontal direction, the first parameter is defined as a height, the height extending in the vertical direction, and the second parameter is defined as a width, the width extending in the horizontal direction. When the first direction is defined by a first axis and the second direction is defined by a second axis orthogonal to the first axis, the predetermined condition holds that: (i) the first and second rectangle drawing objects are parallel with the first axis, (ii) a position of the second rectangle drawing objects along the second axis is the same as a position of the first rectangle drawing object along the second axis, (iii) a width of the second rectangle drawing object is equal to a width of the first rectangle drawing object, and (iv) in the first direction, (a) the second rectangle drawing object is connected to the first rectangle drawing object or (b) the second rectangle drawing object overlaps the first rectangle drawing object.

These as well as other aspects, advantages, and alternatives will become apparent to those of ordinary skill in the art by reading the following detailed description with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

1. Example Apparatus

Figure 2:
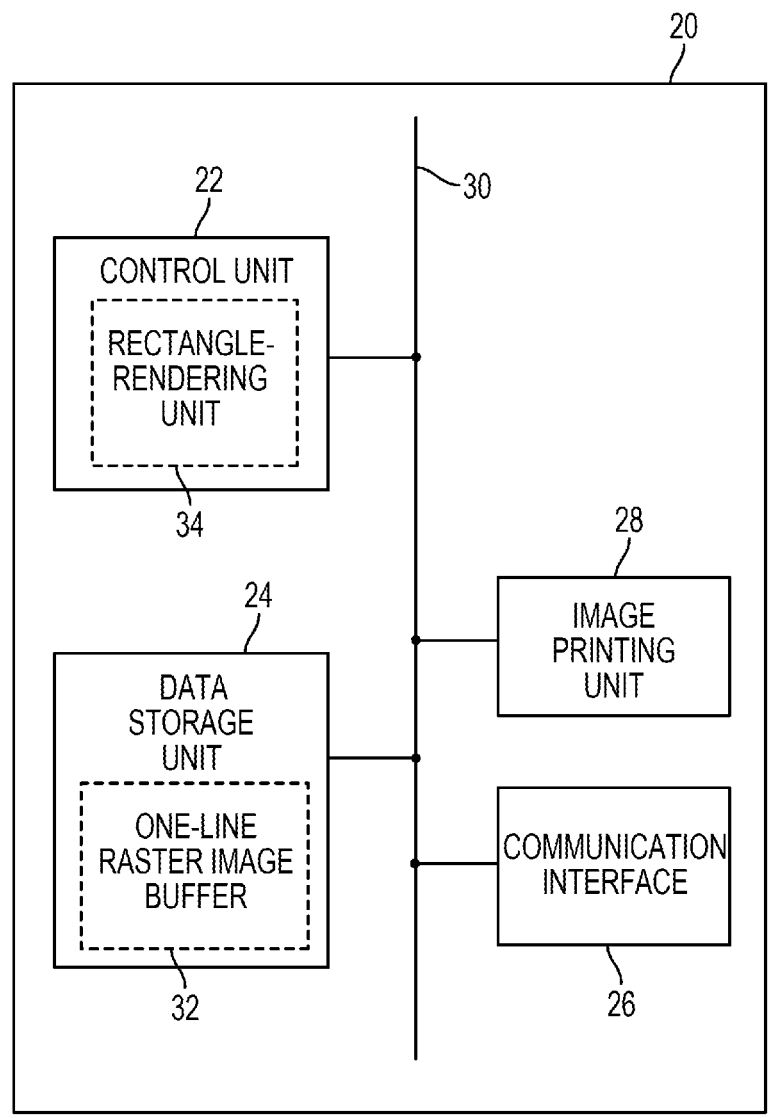
FIG. 2 illustrates an example of a basic configuration of an image forming apparatus in which an example embodiment of the present disclosure may be employed.

FIG. 2 illustrates an example of a basic configuration of an image forming apparatus 20 in which an example embodiment of the present disclosure may be employed.

As illustrated, the image forming apparatus 20 may include a control unit 22, a data storage unit 24, and a communication interface 26, and an image printing unit 28, all connected together via a system bus or other mechanism 30. Further, as shown in FIG. 2, the data storage unit 24 includes a one-line raster image buffer 32 and the control unit 22 includes a rectangle-rendering unit 34.

However, it should be understood that this system arrangement is shown for purpose of example only, and the image forming apparatus 20 may also include other components not shown in FIG. 2.

In general, the control unit 22 may comprise one or more central processing units (CPUs), general purpose processors, and/or dedicated processors (e.g., application specific integrated circuits (ASICs) or digital signal processors (DSPs)). The data storage unit 24 may be a non-transitory computer-readable medium, and can be a volatile and/or nonvolatile type of data storage.

Aside from the one-line raster image buffer 32, the data storage unit 24 may include storage area(s) for holding incoming print data received by the communication interface 26 from an external device, such as a host computer, as well as image data to be printed out by the image printing unit 28. The data storage unit 24 may also store various program logic including program instructions (e.g., machine language instructions or any other higher-level programming instructions) executable by the control unit 22 to carry out various functions of the image forming apparatus 20. The data storage unit can also store other data used by such program logic.

The rectangle-rendering unit 34 may be a logical module implemented in software executed by the control unit 22 or may be a dedicated processing unit (e.g., an ASIC) programmed to execute various functions described herein. Further, the one-line raster image buffer 32 may be a data buffer that functions as a temporary data storage in which one-line raster image data is held as will be described later.

The incoming print data received by the communication interface 26 may be in the form of any suitable page description language (PDL). As known in the art, the PDL is a language that describes an appearance/layout of a printed page using a higher level commands than an actual output raster (or bitmap) image. The PDL data may define various drawing objects, including rectangle drawing objects, as vector graphics expressed by vector coordinates, such as in the form of (X,Y) coordinates. In turn, the control unit 22 may include a raster image processor (RIP) that can transform/convert vector digital information into a raster (or pixel) format, such as in accordance with command(s) in the PDL data.

As noted above, the present disclosure provides a way to improve drawing time for rectangle drawing objects that meet a predetermined condition.

Namely, in accordance with some embodiments, the predetermined condition holds that rectangle drawing objects (i) are parallel with respect to a first direction (e.g., a horizontal x-axis direction), (ii) have equal length along a second direction (e.g., a vertical y-axis direction) that is perpendicular (or orthogonal) to the first direction, (iii) are positioned same way along the second direction, and (iv) are connected or overlap each other in the first direction.

Since a rectangle drawing object is a two-dimensional object having two sides, as generally used herein, plural rectangle drawing objects may be considered parallel with respect to a given direction (e.g., a horizontal x-axis direction) when same one of two sides of each of the rectangle drawing objects is parallel with respect to the given direction (e.g., same respective side of each of the rectangle drawing objects is parallel with an x-axis).

In addition, as generally used herein, plural rectangle drawing objects may be considered as being positioned same way along a given direction when a position of at least two respective vertices of each of the rectangle drawing objects along the given direction is the same (e.g., y-axis coordinates of two vertices of a first rectangle drawing object are the same as y-axis coordinates of two corresponding vertices of a second rectangle drawing object.)

Further, in accordance with some embodiments, the rectangle drawing objects satisfying the predetermined condition are first rendered to one-line raster image data and a drawing region corresponding to those rectangle drawing objects is filled by using the one-line raster image data a number of times (e.g., two or more times). Note that, as used herein, the term "render" (and any grammatical variants thereof, such as "rendering," "rendered," etc.) generally refers a process of converting an input object described by PDL data into a data format which an image forming apparatus can use to form an output image. Such process could include multiple stages, where a stage of converting the input object into an intermediate data format may also be referred as "rendering."

2. Example Operation

Figure 3:
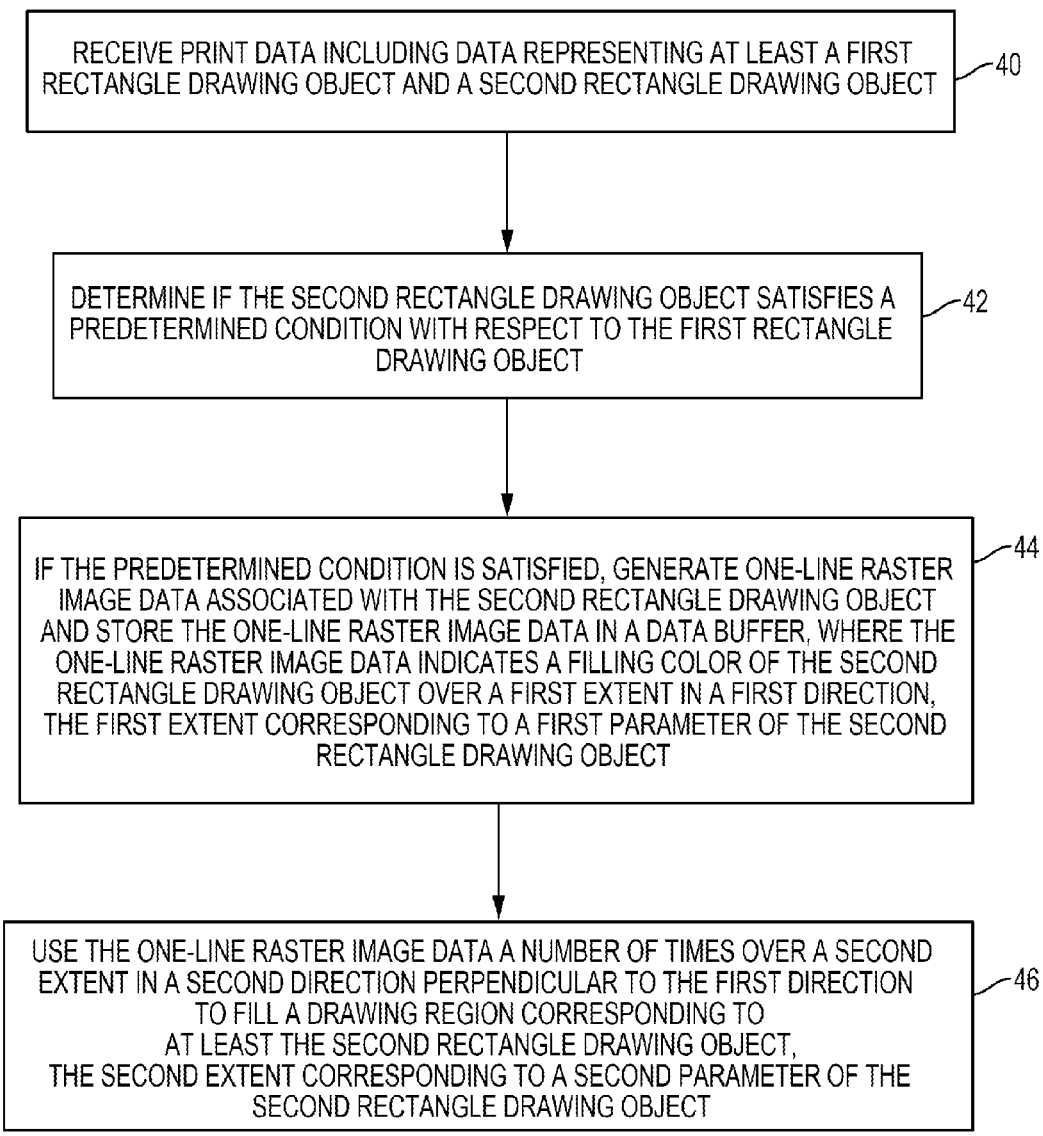
FIG. 3 is a flow chart summarizing an example set of functions that could be carried out in the image forming apparatus of FIG. 1, in accordance with an example embodiment.

FIG. 3 is a flow chart summarizing an example set of functions that could be carried out in accordance with the above-summarized process by the rectangle-rendering unit 34 in the arrangement of FIG. 2, for instance.

At step 40, print data including data representing at least a first rectangle drawing object and a second rectangle drawing object is received. At step 42, a determination is made as to whether the second rectangle drawing object satisfies a predetermined condition with respect to the first rectangle drawing object. At step 44, if the predetermined condition is satisfied, one-line raster image data associated with the second rectangle drawing object is generated and stored in a data buffer, where the one-line raster image data indicates a filling color of the second rectangle drawing object over a first extent in a first direction, the first extent corresponding to a first parameter of the second rectangle drawing object. Then, at step 46, the one-line raster image data is used a number of times over a second extent in a second direction perpendicular to the first direction to fill a drawing region corresponding to at least the second rectangle drawing object, the second extent corresponding to a second parameter of the second rectangle drawing object.

In general, the steps 42 and 44 may be executed with respect to plural rectangle drawing objects, where each new incoming rectangle drawing object in the received print data is compared to a current rectangle drawing object to determine if the predetermined condition is satisfied. If so, one-line raster image data associated with the incoming rectangle drawing object may be generated and added to, or merged/combined with, one-line image data associated with the current rectangle drawing object and already stored in the one-line raster image buffer 32. Then, the merged one-line raster image data may be used a number of times (e.g., used repeatedly (i.e., multiple times)) along the second direction perpendicular to the first direction until a drawing region corresponding to the plural drawing objects is filled. In this regard, the merged one-line raster image data may be used to produce one-line printing image data for filling the drawing region. For instance, halftoned data may be generated from the one-line printing image data to fill the drawing region with the halftoned data.

As an example, the merged one-line raster image data may be used multiple times to fill the drawing region corresponding to the plural drawing objects when a next incoming rectangle drawing object no longer satisfies the predetermined condition or when there are no more incoming drawing objects to process. If the next incoming rectangle drawing object no longer satisfies the predetermined condition or if there are no more drawing objects to process, the drawing region may be subsequently printed out.

Figure 4:
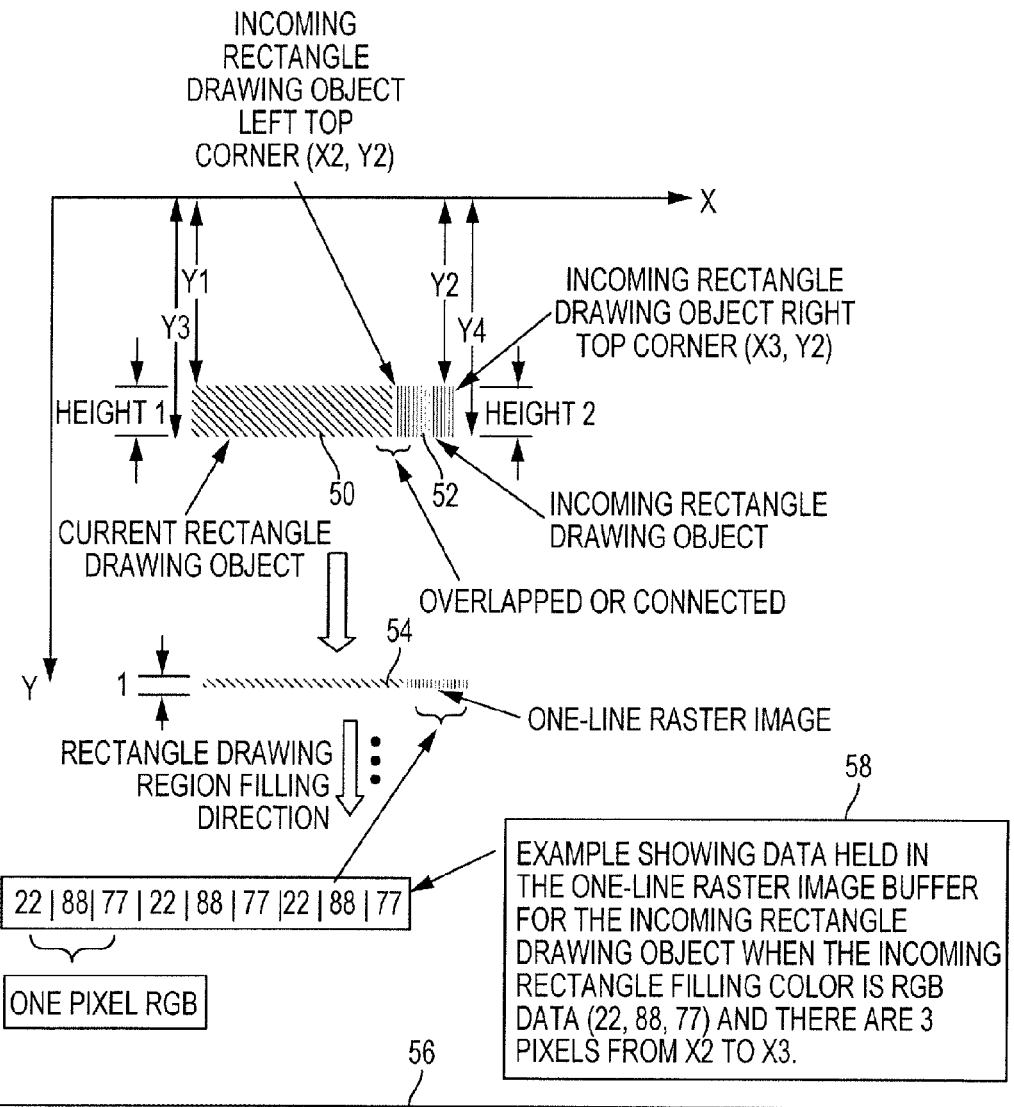
FIG. 4 illustrates an example in which a one-line raster image is generated for two rectangle drawing objects positioned along an x-axis defining a horizontal direction, in accordance with an example embodiment.

FIG. 4 illustrates an example in which a one-line raster image is generated for two rectangle drawing objects positioned along an x-axis that defines a horizontal direction, in accordance with an example embodiment. In other examples, more rectangle drawing objects may exist. A y-axis, perpendicular (orthogonal) to the x-axis, defines a vertical direction. In the example embodiment, the x-axis and the y-axis may define a coordinate system used by the image forming apparatus 20. In one example, in such coordinate system, a left top corner of a page could be defined as a reference/origin point having X and Y coordinates of (0,0). However, the reference/origin point of a page could be defined in a different way depending, e.g., on a coordinate system adopted by a particular image forming apparatus.

As shown in FIG. 4, a current rectangle drawing object 50 and an incoming rectangle drawing object 52 each have a width parameter and a height parameter. The width of each of the current and incoming rectangle drawing objects 50 and 52 extends in the horizontal direction, and the height of each of the current and incoming rectangle drawing objects 50 and 52 extends in the vertical direction. By way of example, for the incoming rectangle drawing object 52, the width extends from X2 coordinate to X3 coordinate along the x-axis, where a left top corner of the incoming rectangle drawing object 52 is denoted by coordinates (X2,Y2) and a right top corner of the incoming rectangle drawing object 52 is denoted by coordinates (X3,Y2).

As shown in FIG. 4 (refer to box 56), the predetermined condition holds that: (i) the incoming rectangle drawing object 52 and the current rectangle drawing object 50 are parallel with the x-axis, (2) the height of the incoming rectangle drawing object 52 (denoted as "HEIGHT 2") is the same as (or equal to) the height of the current rectangle drawing object 50 (denoted as "HEIGHT 1"), (iii) Y coordinate of the incoming rectangle drawing object 52 (e.g., Y2) is the same as Y coordinate of the current rectangle drawing object 50) (e.g., Y1) (in other words, a position of the incoming rectangle drawing object 52 along the y-axis is the same as a position of the current rectangle drawing object 50 along the y-axis), and (iv) in the x-axis direction, the incoming rectangle drawing object 52 overlaps or is connected with the current rectangle drawing object. Note that with respect to item (iii), the position of the incoming rectangle drawing object 52 along the y-axis would be considered to be the same as the position of the current rectangle drawing object 50 along the y-axis if, for example, Y4 coordinate of the incoming rectangle drawing object 52 (as shown in FIG. 4) and Y3 coordinate of the current rectangle drawing object 50 (as shown in FIG. 4) were instead used as reference points and were both the same.

Accordingly, since the incoming rectangle drawing object 52 satisfies the predetermined condition with respect to the current rectangle drawing object 50, one-line raster image data associated with the incoming rectangle drawing object 52 is generated and stored in the one-line raster image buffer 32. The raster image data indicates a filling color of the incoming rectangle drawing object 52 over the width of the incoming rectangle drawing object 52. In the raster format, the width of the incoming rectangle drawing object 52 may be defined by a given number of pixels (e.g., m pixels, where m represents a number). The one-line raster image data will then include color data for each of those pixels for a single raster image line that is one-pixel wide.

To illustrate, FIG. 4 (refer to box 58) shows one example of data held in the one-line raster image buffer 32 for the incoming rectangle drawing object 52 when a filling color of the incoming rectangle drawing object 52 is defined by RGB data (22, 88, 77) and there are three pixels over an extent from X2 coordinate to X3 coordinate, where that extent corresponds to the width of the incoming rectangle drawing object 52. Note, however, that a rectangle filling color may be generally defined in any other suitable color space other than the RGB color space.

As shown in FIG. 4, the one-line raster image data associated with the incoming rectangle drawing object 52 may be merged with one-line raster image data associated with the current rectangle drawing object 50 and previously stored in the one-line raster image buffer 32 to generate a merged one-line raster image data associated with the current and incoming rectangle drawing objects 50 and 52. As generally used herein, a raster image corresponding to one-line raster image data (or, a raster image generated from the one-line raster image data), will be referred to as "one-line raster image." To illustrate, FIG. 4 depicts an example of a one-line raster image 54 corresponding to the merged one-line raster image data associated with the current and incoming rectangle drawing objects 50 and 52.

It should be understood, however, that in other examples, the merged one-line raster image data could include one-line raster image data for more than two rectangle drawing objects as more incoming rectangle drawing objects satisfying the predetermined condition are processed. For example, once the incoming rectangle drawing object 52 is processed, this incoming rectangle drawing object will become a "current" rectangle drawing object (possibly together with the current rectangle drawing object 50 if coordinates of the current rectangle drawing object 50 and the incoming rectangle drawing object 52 are merged, as will be described later) with respect to which a next incoming rectangle drawing object may be checked for the predetermined condition. If the predetermined condition is satisfied, one-line raster image data associated with the next incoming rectangle drawing object will be subsequently merged with one-line raster image data already held in the one-line raster image buffer 32 for other previously processed rectangle drawing objects in a group of rectangle drawing objects (e.g., the rectangle drawing objects 50 and 52).

Further, when a very first rectangle drawing object is processed for a given group of rectangle drawing objects, that very first rectangle drawing object cannot satisfy the predetermined condition with respect to any other previous rectangle drawing object. However, in one embodiment, one-line raster image data associated with that rectangle drawing object may be generated and stored in the one-line raster image buffer 32.

Figure 1:
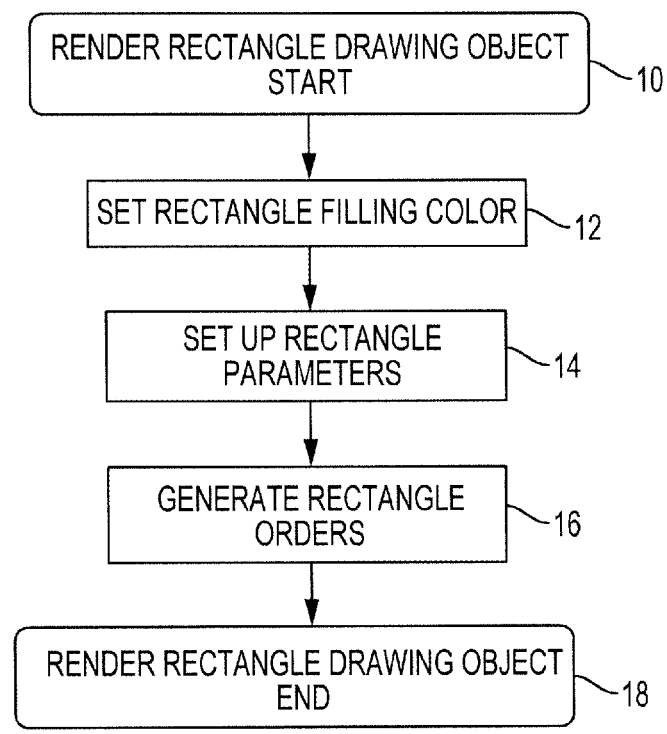
FIG. 1 is a flow chart depicting an example of a related art method of rendering a rectangle drawing object.

In an alternative embodiment, such very first rectangle drawing object may be rendered using a traditional method, as shown in FIG. 1. Subsequently, a determination can be made as to whether the following incoming rectangle drawing object satisfies the predetermined condition with respect to the very first one rectangle drawing object, and raster image data accumulation in the raster image buffer 32 can begin. Then, an image generated based on the accumulated raster image data can be merged with an image of the very first rectangle drawing object to generate a final output image.

As further shown in FIG. 4, the merged one-line raster image data held in the one-line raster image buffer 32 may be subsequently used a number of times over a height extent in the vertical direction (designated as "rectangle drawing region filling direction," in FIG. 4) to fill a drawing region corresponding to the current and incoming rectangle drawing objects 50 and 52. For example, if the height of each of the current and incoming rectangle drawing objects 50 and 52 is defined by n pixels (where n represents a number), then the merged one-line raster image data would be used (n−1) times to fill the drawing region for the current and incoming rectangle drawing objects.

Figure 5:
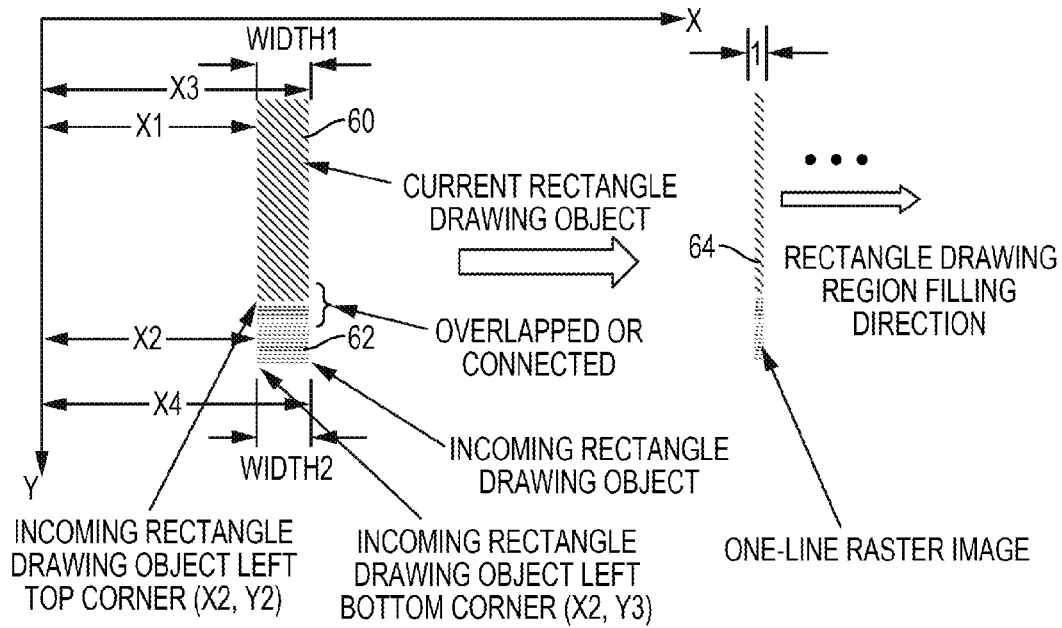
FIG. 5 illustrates an example in which a one-line raster image is generated for two rectangle drawing objects positioned along a y-axis defining a vertical direction, in accordance with an example embodiment.

FIG. 5 illustrates another example in which a one-line raster image is generated for two rectangle drawing objects, namely a current rectangle drawing object 60 and an incoming rectangle drawing object 62, positioned along the y-axis that defines the vertical direction, in accordance with an example embodiment. In other examples, more rectangle drawing objects may exist.

Similar to FIG. 4, the width of each of the current and incoming rectangle drawing objects 60 and 62 extends in the horizontal direction, and the height of each of the current and incoming rectangle drawing objects 60 and 62 extends in the vertical direction. As in the example of FIG. 4, for the incoming rectangle drawing object 62, the width extends from X2 coordinate to X3 coordinate along the x-axis, where a left top corner of the incoming rectangle drawing object 62 is denoted by coordinates (X2,Y2) and a right bottom corner of the incoming rectangle drawing object 62 is denoted by coordinates (X2,Y3).

As shown in FIG. 5 (refer to box 66), the predetermined condition holds that: (i) the incoming rectangle drawing object 62 and the current rectangle drawing object 60 are parallel with the y-axis, (2) the width (denoted as "WIDTH 2") of the incoming rectangle drawing object 62 is the same as (or equal to) the width (denoted as "WIDTH 2") of the current rectangle drawing object 60, (iii) X coordinate of the incoming rectangle drawing object 62 (e.g., X2) is the same as X coordinate of the current rectangle drawing object 60 (e.g., X1) (in other words, a position of the incoming rectangle drawing object 62 along the x-axis is the same as a position of the current rectangle drawing object 60 along the x-axis), and (iv) in the y-axis direction, the incoming rectangle drawing object 62 overlaps or is connected with the current rectangle drawing object 60. Note that, with respect to item (iii), the position of the incoming rectangle drawing object 62 along the x-axis would be considered to be the same as the position of the current rectangle drawing object 60 along the x-axis if, for example, X4 coordinate of the incoming rectangle drawing object 62 and X3 coordinate of the current rectangle drawing object 60 were instead used as reference points and were the same.

Accordingly, since the predetermined condition is satisfied with respect to the incoming rectangle drawing object 62, one-line raster image data associated with the incoming rectangle drawing object 62 is generated and stored in the one-line raster image buffer 32. The raster image data indicates a filling color of the incoming rectangle drawing object 62 over the height of the incoming rectangle drawing object 62. In the raster format, the height of the incoming rectangle drawing object 62 may be defined by a given number of pixels (e.g., m pixels, where m represents a number). The one-line raster image data will then include color data for each of those pixels for a single raster image line that is one-pixel wide.

As shown in FIG. 5, the one-line raster image data associated with the incoming rectangle drawing object 62 may be merged with one-line raster image data associated with the current drawing object 60 and previously stored in the one-line raster image buffer 32 to generate a merged one-line raster image data associated with the current and incoming rectangle drawing objects 60 and 62. FIG. 5 depicts an example of a one-line raster image 64 corresponding to the merged one-line raster image data associated with the current and incoming rectangle drawing objects 60 and 62. As further shown in FIG. 5, the merged one-line raster image data held in the one-line raster image buffer 32 may be subsequently used a number of times over a width extent in the horizontal direction (designated as "rectangle drawing region filling direction," in FIG. 5) to fill a drawing region corresponding to the current and incoming rectangle drawing objects 60 and 62.

For example, if the width WIDTH 1 and WIDTH 2 of each of the current and incoming rectangle drawing objects 60 and 62 is defined by n pixels (where n represents a number), then the merged one-line raster image data would be used (n−1) times to fill the drawing region for the current and incoming rectangle drawing objects 60 and 62.

FIGS. 6-14 are additional flow charts depicting various processes that could be carried out in accordance with one or more example embodiments by the rectangle rendering unit 34, such as in connection with horizontal and vertical cases shown in FIGS. 4-5, for instance.

Figure 6:
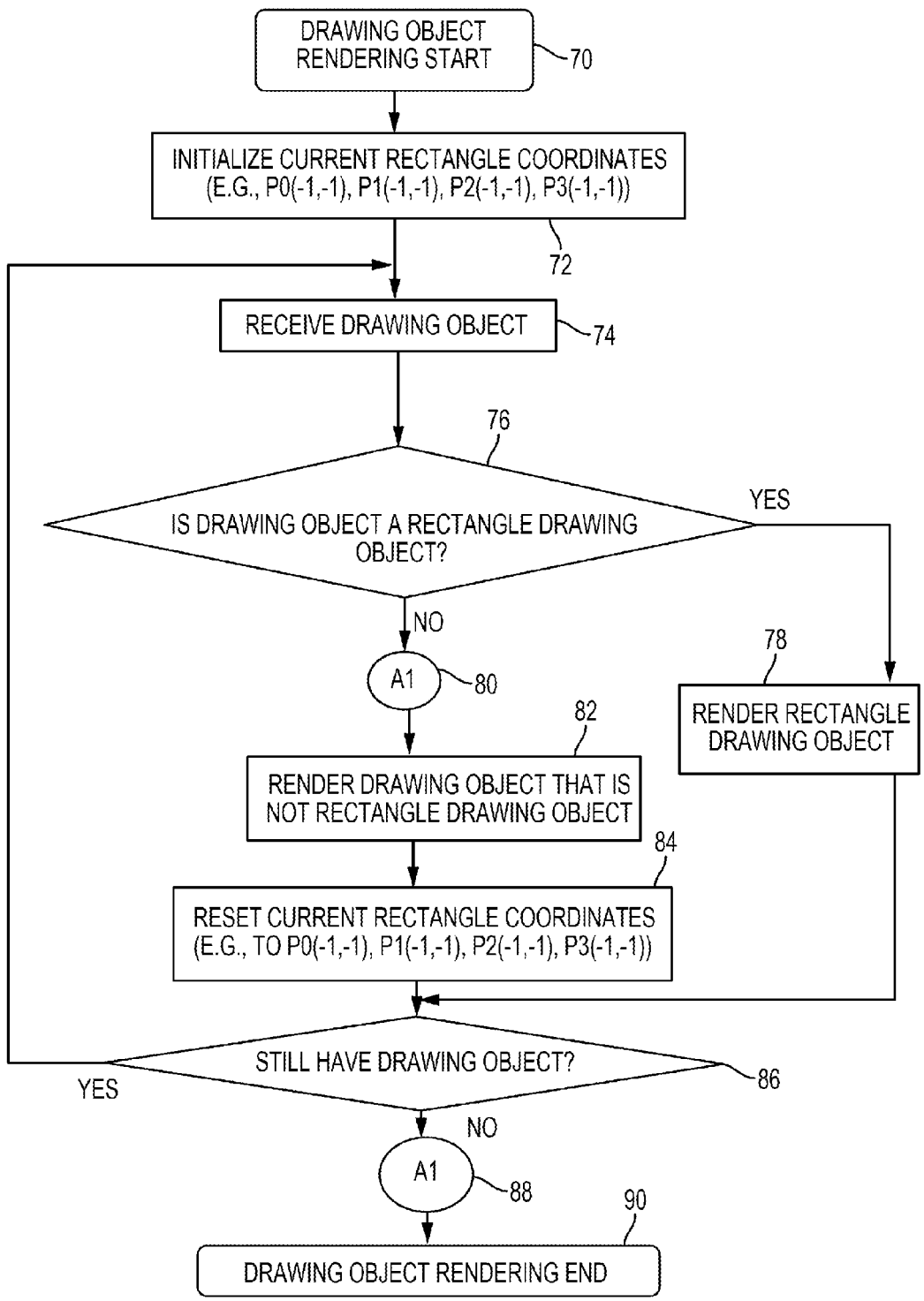
FIG. 6 is a flowchart depicting a top-level process for rendering a drawing object, in accordance with an example embodiment.

FIG. 6 depicts a top-level process for rendering a drawing object. At step 70, rendering of the drawing object starts. At step 72, current rectangle coordinates for a rectangle drawing object are initialized (e.g., as P0 (−1,−1), P1 (−1,−1), P2 (−1,−1), P3 (−1,−1)), where P0-P3 correspond to four points defining a rectangle, and X and Y coordinates of each point are set to some default value outside of a valid coordinate range for a page. At step 74, a drawing object is received. At step 76, a determination is made as to whether the drawing object is a rectangle drawing object. The step 76 involves determination whether the drawing object has four points and meets a first judgment condition ("JUDGEMENT CONDITION 1") or a second judgment condition ("JUDGEMENT CONDITION 2"). FIGS. 19-26 depict various examples of how this rectangle determination may be carried out.

To illustrate, FIGS. 19-22 depict four instances of the first judgment condition (shown respectively in boxes 246, 248, 250, and 252), where, for each instance, four points P1, P2, P3, and P4 of respective drawing objects 230, 232, 234, and 236 are used to judge whether a given drawing object is a rectangle drawing object. Similarly, FIGS. 23-26 depict four instances of the second judgment condition (shown respectively in boxes 254, 256, 258, and 260), where, for each instance, four points P1, P2, P3, and P4 of respective drawing objects 238, 240, 242, and 244 are used to judge whether a given drawing object is a rectangle drawing object. In both cases, the points P1-P4 vary in order and directions from one rectangle drawing object to another.

Figure 9:
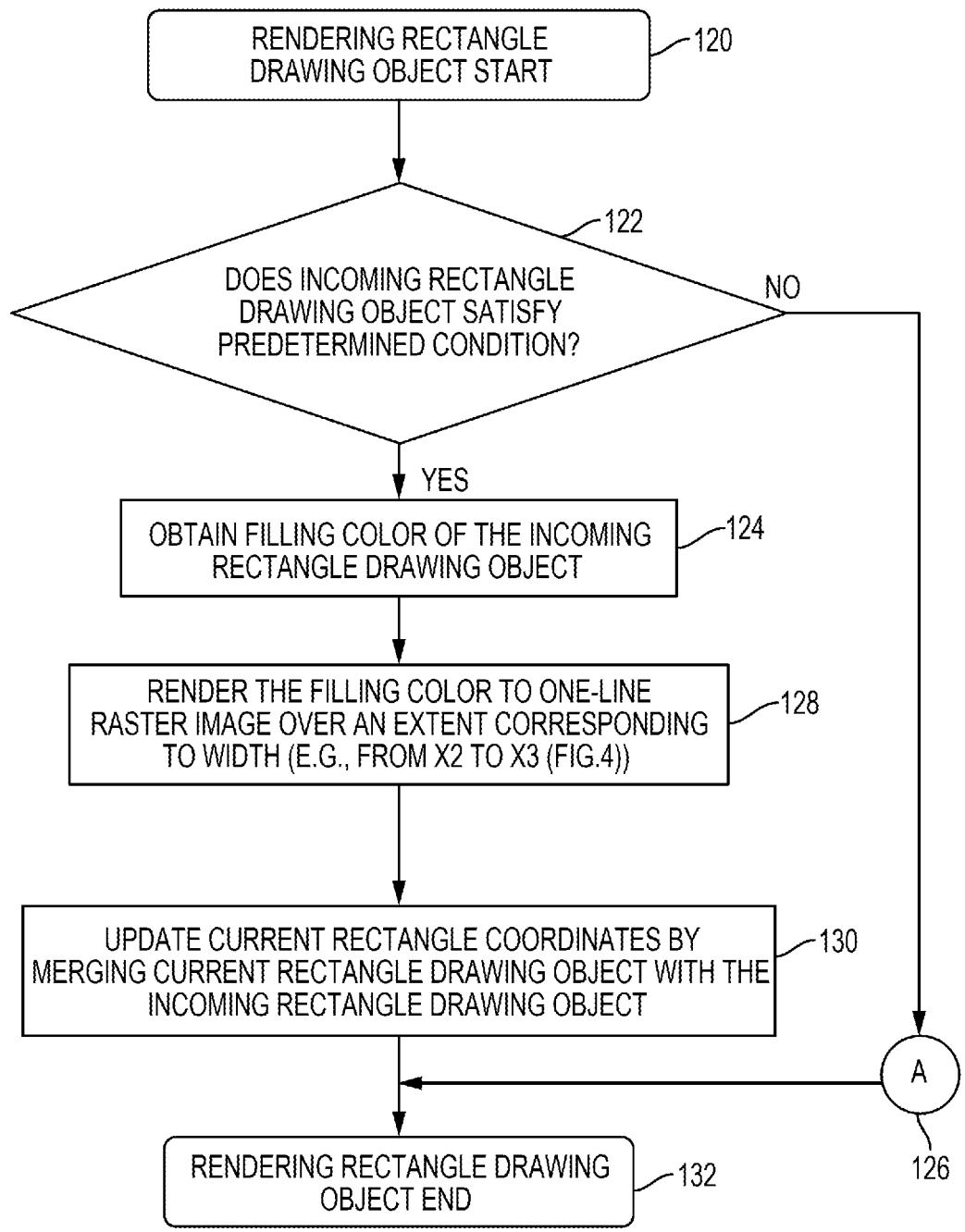
FIG. 9 is a flowchart depicting a process of rendering a rectangle drawing object in a horizontal case in which rectangle drawing objects are positioned along a horizontal direction.
Figure 12:
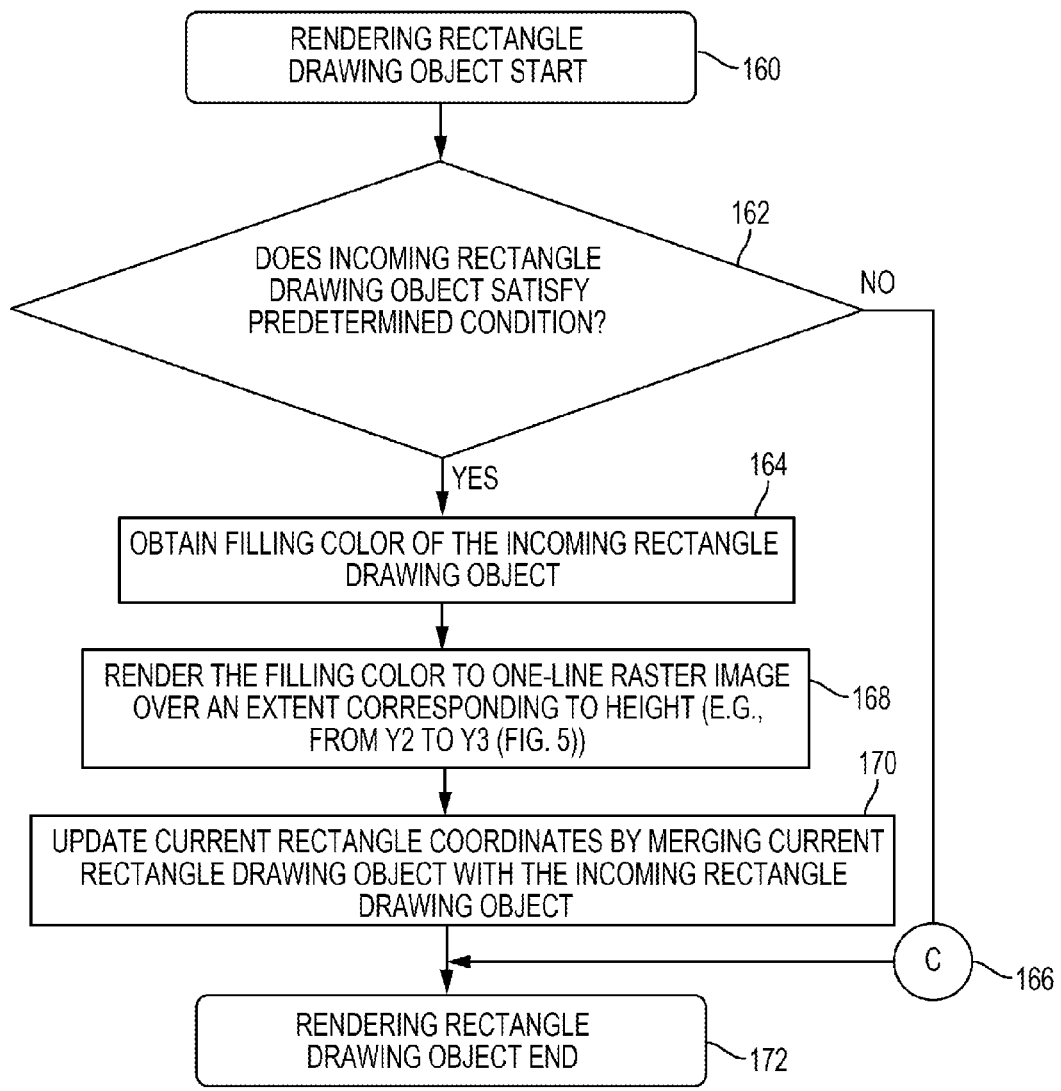
FIG. 12 is a flowchart depicting a process of rendering a rectangle drawing object in a case in which rectangle drawing objects are positioned along a vertical direction.

If a result of the determination at step 76 is that the drawing object is a rectangle drawing object, at step 78, a process of rendering rectangle drawing object is executed. The process of rendering rectangle drawing object is shown in FIGS. 9 and 12 for horizontal and vertical cases, respectively, as will be described later. On the other hand, if the result of the determination at step 76 is that the drawing object is not a rectangle drawing object, the flow moves to step 80 at which a process designated by "A1" and shown in FIG. 7 is executed.

Figure 7:
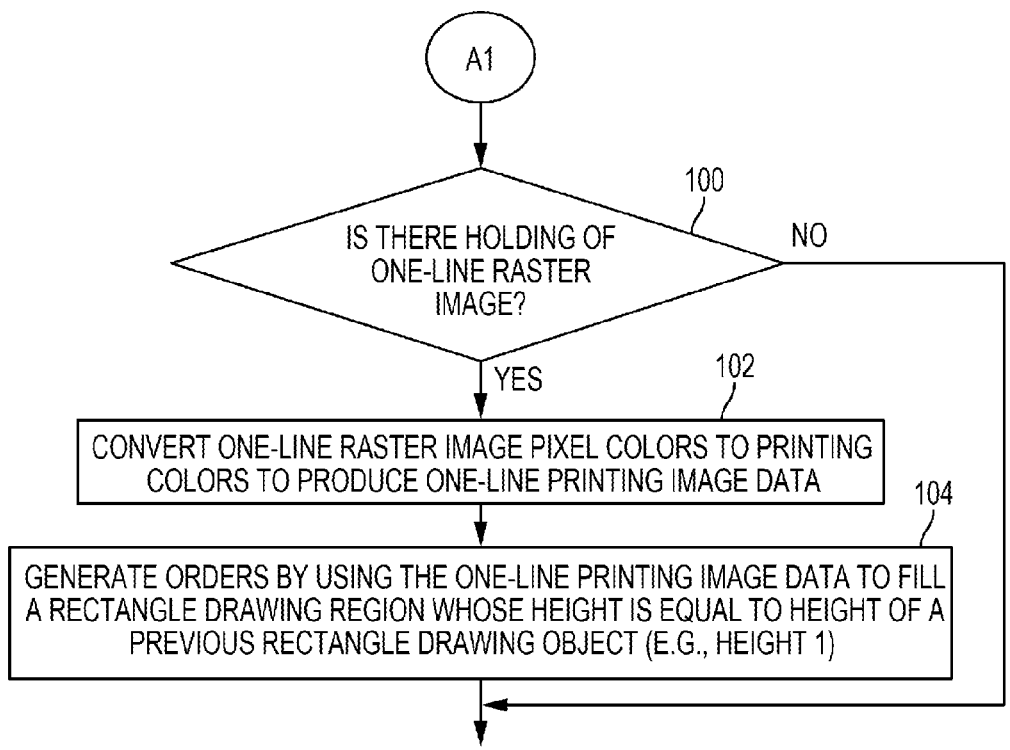
FIG. 7 is a flow chart depicting a process directed to drawing one-line raster image in a horizontal direction, in accordance with an example embodiment.

The process A1 shown in FIG. 7 is directed to drawing a one-line raster image in a horizontal direction, such as in the case shown in FIG. 4, where the one-line raster image 54 is generated in the horizontal direction and rectangle drawing region filling is performed over a height extent in a vertical direction. Thus, by way of example, FIG. 6 assumes such horizontal case. However, if the one-line image was generated in the vertical direction, as shown in FIG. 5, a process designated by "A1'" and shown in FIG. 8 would be executed instead at step 80.

Following the step 80, at step 82, the drawing object that is not a rectangle drawing object is rendered. Once the non-rectangle drawing object is rendered, at step 64, the current rectangle coordinates are reset (e.g., to P0 (−1,−1), P1 (−1,−1), P2 (−1,−1), P3 (−1,−1)). Once the coordinates are reset at step 84 or the rectangle drawing object rendering process at step 78 is executed, the flow moves to step 86 at which a decision is made as to whether there is still another drawing object to be processed. If there is still another drawing object coming, then the flow returns to step 74. If there is not another drawing object, then, at step 88, the process A1 (or A1' as explained above) is executed again. The rendering of the drawing object ends at step 90.

The process A1 shown in FIG. 7 will now be described. At step 100, a determination is made if there is holding of a one-line raster image. As noted above, the process A1 follows the determination that the drawing object is not a rectangle drawing object. Thus, at this time, any one-line raster image data corresponding to the one-line raster image and held in the one-line raster image buffer 32 is to undergo a conversion to printing colors and orders for the one-line raster image will be generated. Hence, step 100 involves checking whether there is any one-line raster image data held in the one-line raster image buffer 32. If not, the flow returns to step 82 of FIG. 6. If there is holding of a one-line raster image, at step 102, the one-line raster image pixel colors are converted to printing colors to produce one-line printing image data. Then, at step 104, orders (or printing commands) are generated by using the one-line printing image data to fill a rectangle drawing region whose height is equal to a height of a previous rectangle drawing object that was processed (e.g., equal to HEIGHT 1 of the current rectangle drawing object 50 shown in FIG. 4). In this regard, the generated orders represent printing commands that will specify a number of times that the one-line printing image data will need to be used over an extent corresponding to the height to fill the rectangle drawing region.

Figure 8:
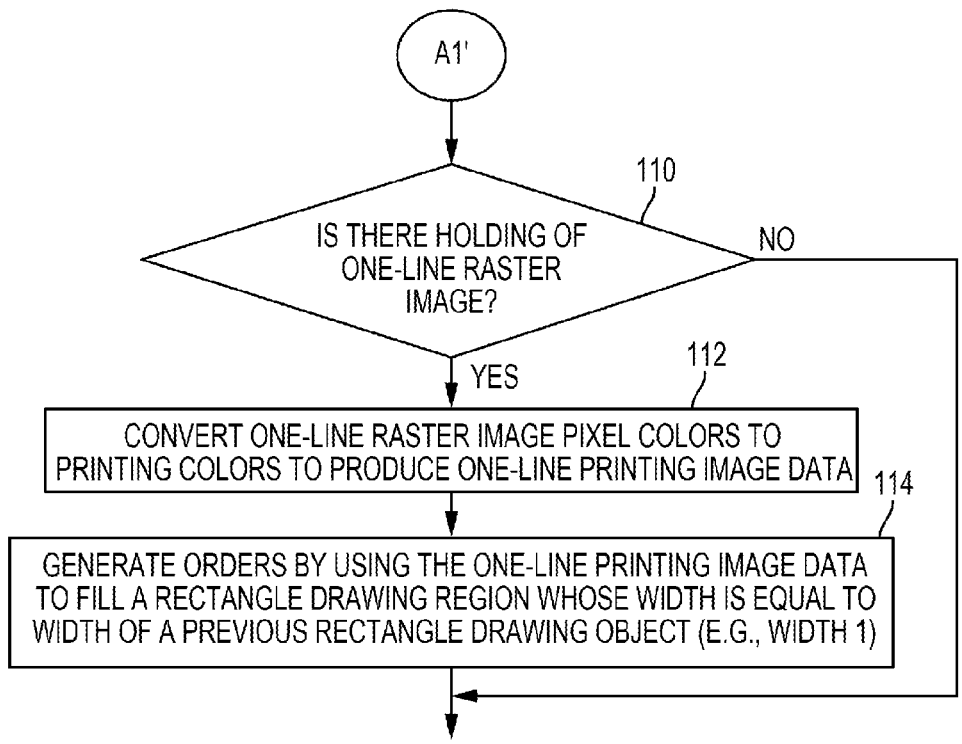
FIG. 8 is a flow chart depicting a process directed to drawing one-line raster image in a vertical direction, in accordance with an example embodiment.

The process A1' shown in FIG. 8 is directed to drawing a one-line raster image in a vertical direction, such as in the case shown in FIG. 5, where the one-line raster image 64 is generated in the vertical direction and rectangle drawing region filling is performed over a width extent in a horizontal direction. Steps 110-114 are the same as in the process A1. However, at step 114, orders are generated by using one-line printing image data to fill a rectangle drawing region whose width is equal to a width of a previous rectangle drawing object that was processed (e.g., equal to WIDTH 1 of the current rectangle drawing object shown in FIG. 5). In this regard, the generated orders represent printing commands that will specify a number of times that the one-line printing image data will need to be used over an extent corresponding to the width to fill the rectangle drawing region.

FIG. 9 is a flowchart depicting a process of rendering a rectangle drawing object for a horizontal case in which rectangle drawing objects are positioned along a horizontal direction, as shown in FIG. 4, in which the x-axis defines the horizontal direction. At step 120, rendering of rectangle drawing object starts. At step 122, a determination is made as to whether a predetermined condition is satisfied by an incoming rectangle drawing object with respect to a current rectangle drawing object. For example, with reference to FIG. 4, a determination is made as to whether the current and the incoming rectangle drawing objects 50 and 52 are parallel with the x-axis, the incoming rectangle drawing object 52 has the same height and the same Y coordinate/position along the y-axis as the current rectangle drawing object 50, and the incoming rectangle drawing object 52 overlaps or is connected with the current rectangle drawing object 50 in the x-axis direction. If the predetermined condition is satisfied, the flow moves to step 124 at which a filling color of the incoming rectangle drawing object is obtained. If the predetermined condition is not satisfied, at step 126, the flow moves to a process designated by "A" and shown in FIG. 10.

Assuming that the predetermined condition is satisfied, following step 124, at step 128, the filling color of the incoming rectangle drawing object is rendered to one-line raster image over an extent corresponding to a width of the incoming rectangle drawing object in the horizontal direction, e.g., an extent from X2 to X3 along the x-axis as shown in FIG. 4. More specifically, raster image data is generated and stored in the one-line raster image buffer 32, where the raster image data includes pixel color data for each of the pixels over the width extent (e.g., from X2 to X3, as in FIG. 4).

Figure 15:
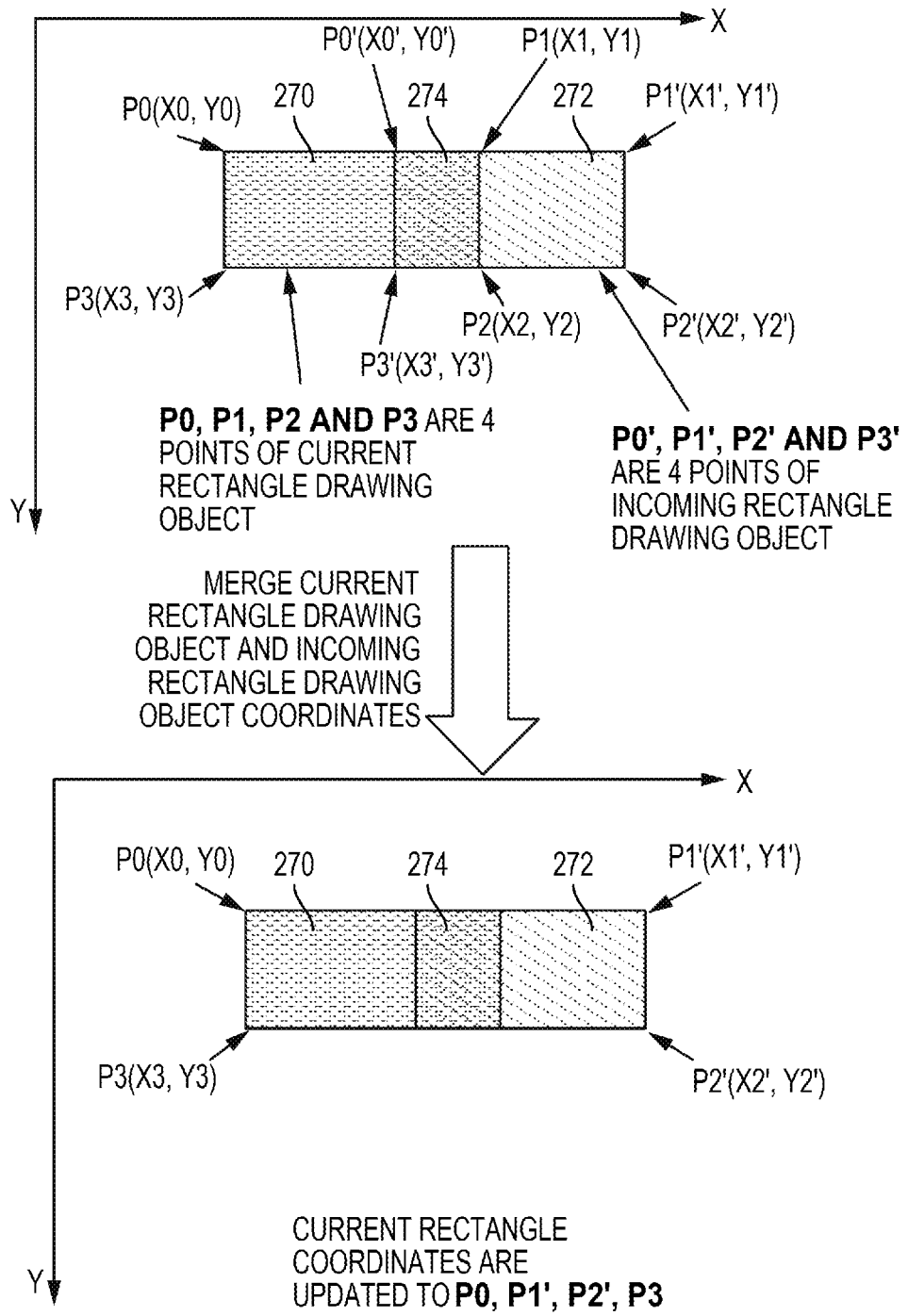
FIG. 15 illustrates an example of how to update current rectangle drawing object coordinates for the horizontal case, in accordance with an example embodiment.

Then, at step 130, current rectangle coordinates are updated by merging coordinates of the current rectangle drawing object with coordinates of the incoming rectangle drawing object as shown in FIG. 15 (for the horizontal case), as will be briefly described later. This way, coordinates defining a rectangle drawing region to be printed out can be continuously updated each time another rectangle drawing object satisfying the predetermined condition is processed. Note, however, that in alternative embodiments, such updating can be performed at a different stage or done in a different way altogether.

Figure 10:
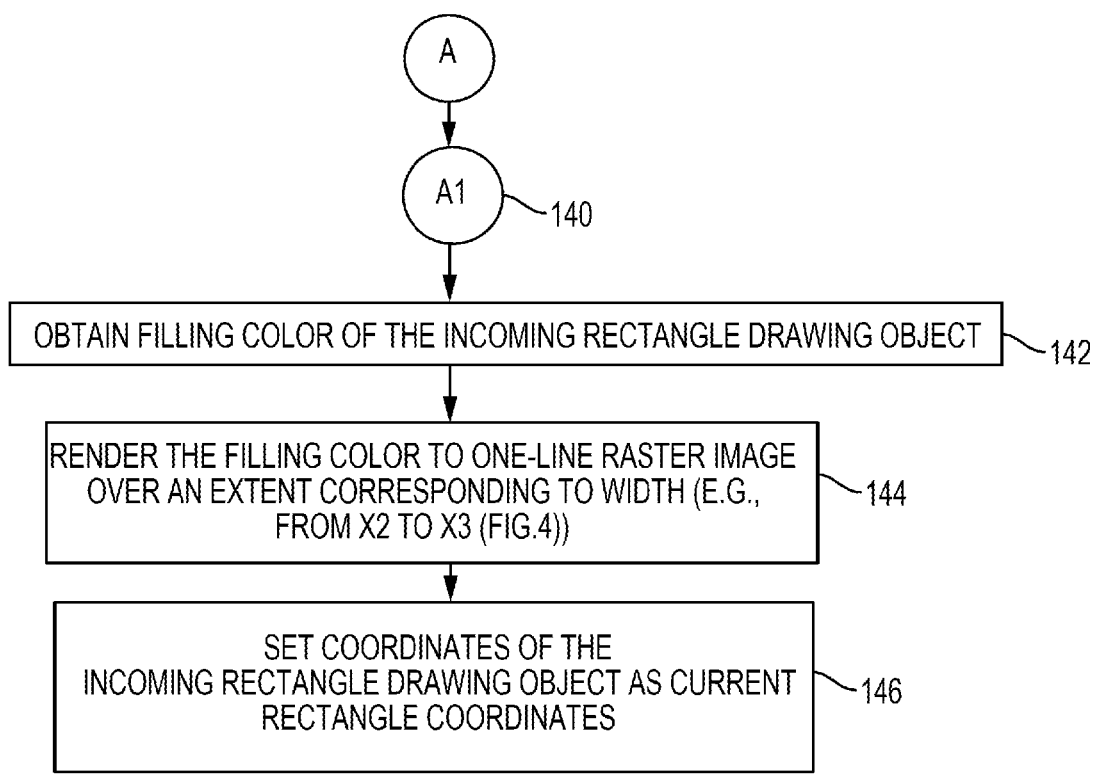
FIG. 10 is a flow chart depicting a process referenced in the process of FIG. 9, in accordance with an example embodiment.

As noted above, if the result of the determination at step 122 is that the predetermined condition is not satisfied, the flow of FIG. 9 moves to the process A depicted in FIG. 10. As shown in FIG. 10, at step 140, the process A1 shown in FIG. 7 is executed. Then, at step 142, a filling color of the incoming rectangle drawing object is obtained, and at step 144, the filling color of the incoming rectangle drawing object is rendered to a one-line raster image over an extent corresponding to a width of the incoming rectangle drawing object in the horizontal direction, e.g., an extent from X2 to X3 along the x-axis, as shown in FIG. 4. At step 146, coordinates of the incoming rectangle drawing object are set as current rectangle coordinates (or coordinates of a current rectangle drawing object). This setting is based on the assumption that a next incoming rectangle drawing object will satisfy the predetermined condition so that a new sequence or group of rectangle drawing objects that satisfy the predetermined condition will be rendered as a new one-line raster image.

Referring back to FIG. 9, following steps 126 and 130, the rendering process of the rectangle drawing object ends at step 132.

Figure 11:
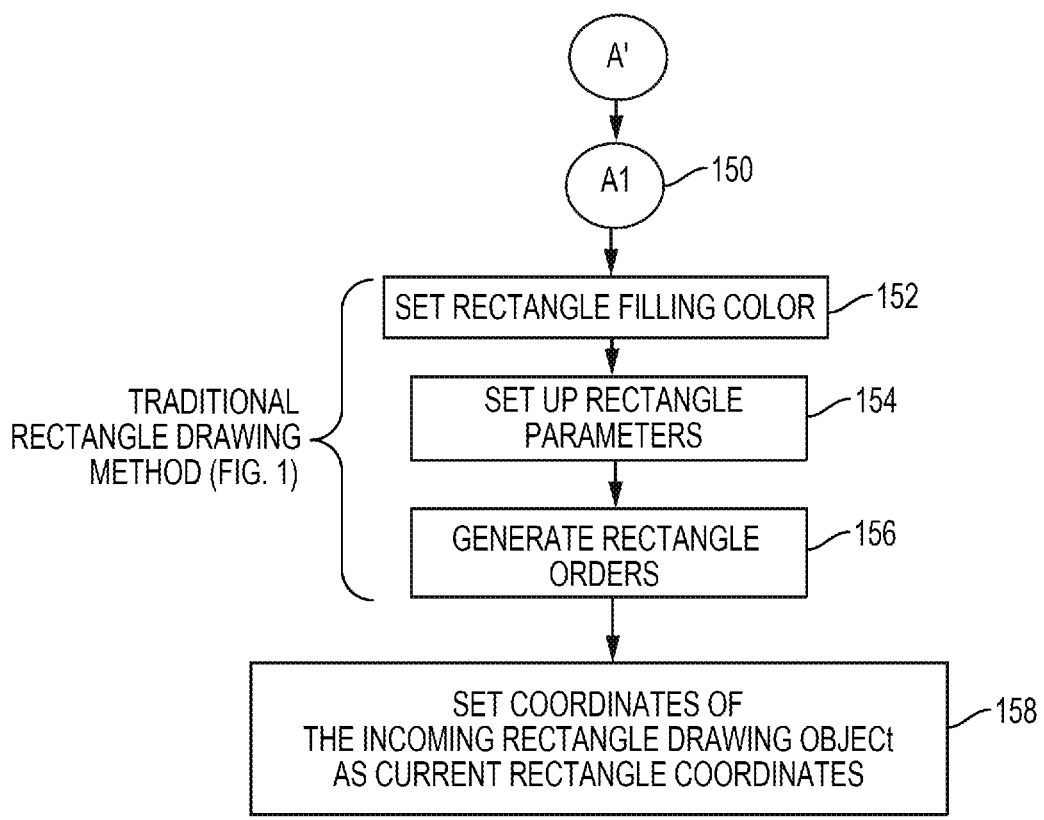
FIG. 11 is a flow chart depicting an alternative to the process of FIG. 10.

FIG. 11 is a flowchart showing an alternative of the process A illustrated in FIG. 10. Namely, in the process designated as "A" and shown in FIG. 11, instead of executing the steps of obtaining the filling color and rendering the filing color, the traditional method of rendering a rectangle drawing object, as shown in FIG. 1, is executed instead. Hence, unlike in FIG. 10, the incoming rectangle drawing object that does not satisfy the predetermined condition is rendered using the traditional method covered by steps 152-156. Then, at step 158, similar to step 146 in FIG. 10, the coordinates of the incoming rectangle drawing object are set as the current rectangle coordinates.

As noted above in connection with FIG. 9, step 130 involves updating the current rectangle coordinates by merging the coordinates of the current rectangle drawing object with the coordinates of the incoming rectangle drawing object. An example of this process (for the horizontal case) for two overlapping rectangle drawing objects is shown in FIG. 15. As shown in FIG. 15, four points of a current rectangle drawing object 270 are P0, P1, P2, and P3 with their respective coordinates. Four points of an incoming rectangle drawing object 272 are P0', P1', P2', and P3' with their respective coordinates. As shown in FIG. 15, an area 274 defined by the points P0', P1, P3', and P2 corresponds to an area of overlap between the two rectangle drawing objects 270 and 272. As shown in FIG. 15, current rectangle drawing object coordinates and incoming rectangle drawing object coordinates are merged so that after the coordinates are merged, the current rectangle coordinates correspond to coordinates of points P0, P1', P2', and P3. Hence, the rectangle drawing object coordinates associated with one-line raster image data held in the one-line raster image buffer 32 are updated for a drawing area of the one-line raster image. One skilled in the art will recognize that if the two rectangle drawing objects 270 and 272 were connected, rather than overlapping, with points P0' and P1 being the same and points P3' and P2 being the same, the current rectangle coordinates would also correspond to the coordinates of points P0, P1', P2', and P3 after the merge.

Figure 16:
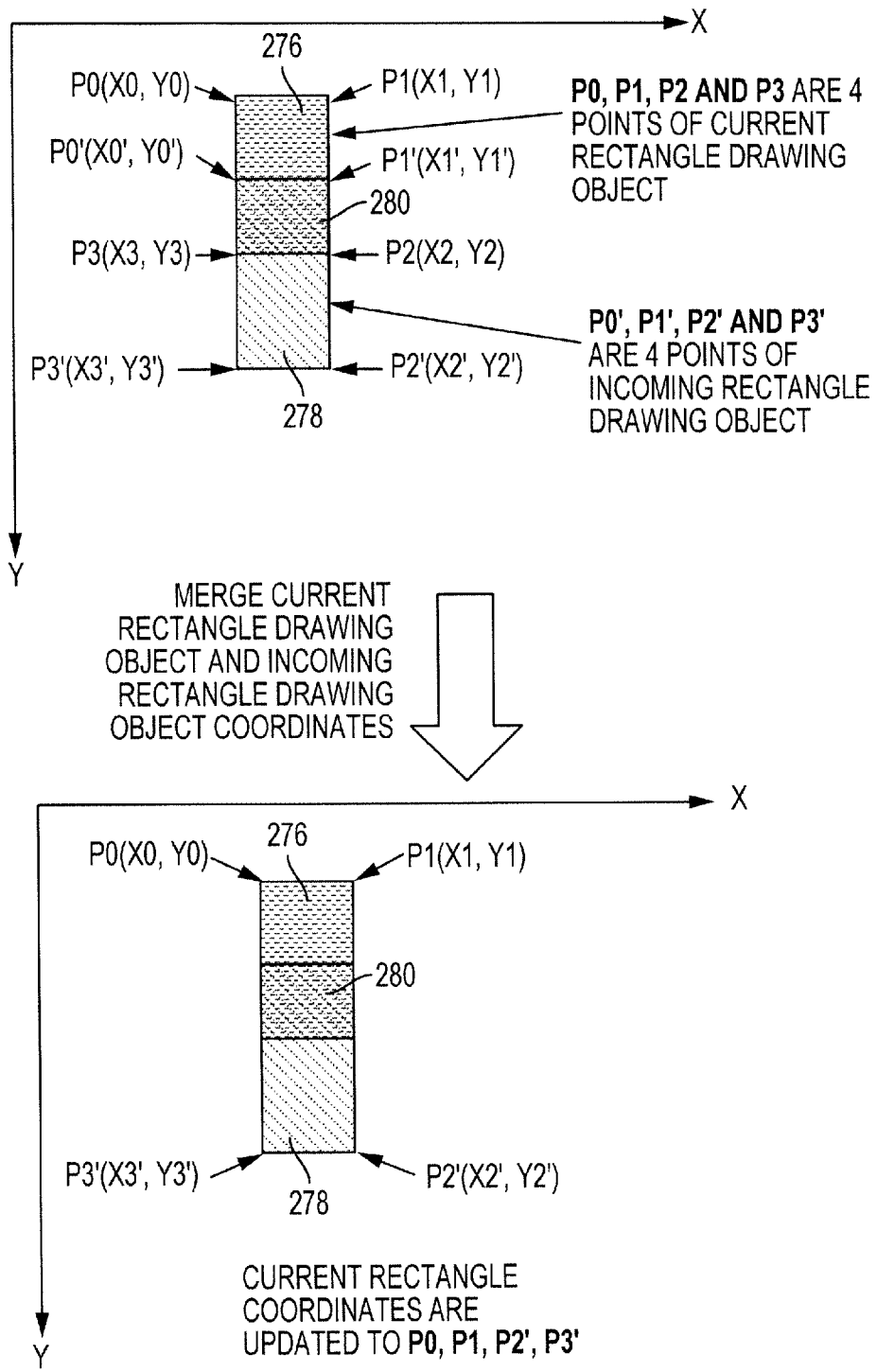
FIG. 16 illustrates an example of how to update current rectangle drawing object coordinates for the vertical case, in accordance with an example embodiment.

FIG. 16 then depicts a corresponding coordinate update process for the vertical case, as shown in FIG. 5 for instance. As shown, the process of FIG. 16 involves a current rectangle drawing object 276 having points P0, P1, P2, and P3 with their respective coordinates, and an incoming rectangle drawing object 278 having points P0', P1', P2', and P3' with their respective coordinates. As shown in FIG. 16, an area 280 defined by the points P0', P1', P3, and P2 corresponds to an area of overlap between the two rectangle drawing objects 276 and 278. In the process of FIG. 16, current rectangle drawing object coordinates and incoming rectangle drawing object coordinates are merged so that after the coordinates are merged, the current rectangle coordinates correspond to coordinates of points P0, P1, P2', and P3'. As in the case of the process illustrated in FIG. 15, one skilled in the art will recognize that if the two rectangle drawing objects 276 and 278 were connected, rather than overlapping, with points P0' and P3 being the same and points P1' and P2 being the same, the current rectangle coordinates would also correspond to the coordinates of points P0, P1, P2', and P3' after the merge.

Figure 13:
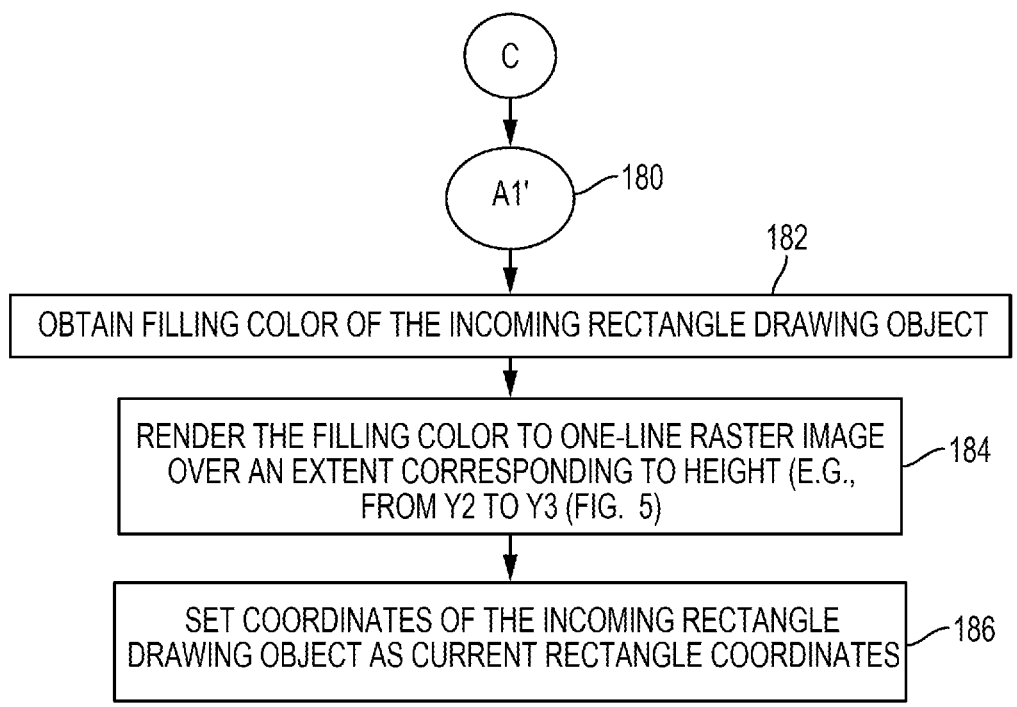
FIG. 13 is a flow chart depicting a process referenced in the process of FIG. 12, in accordance with an example embodiment.
Figure 14:
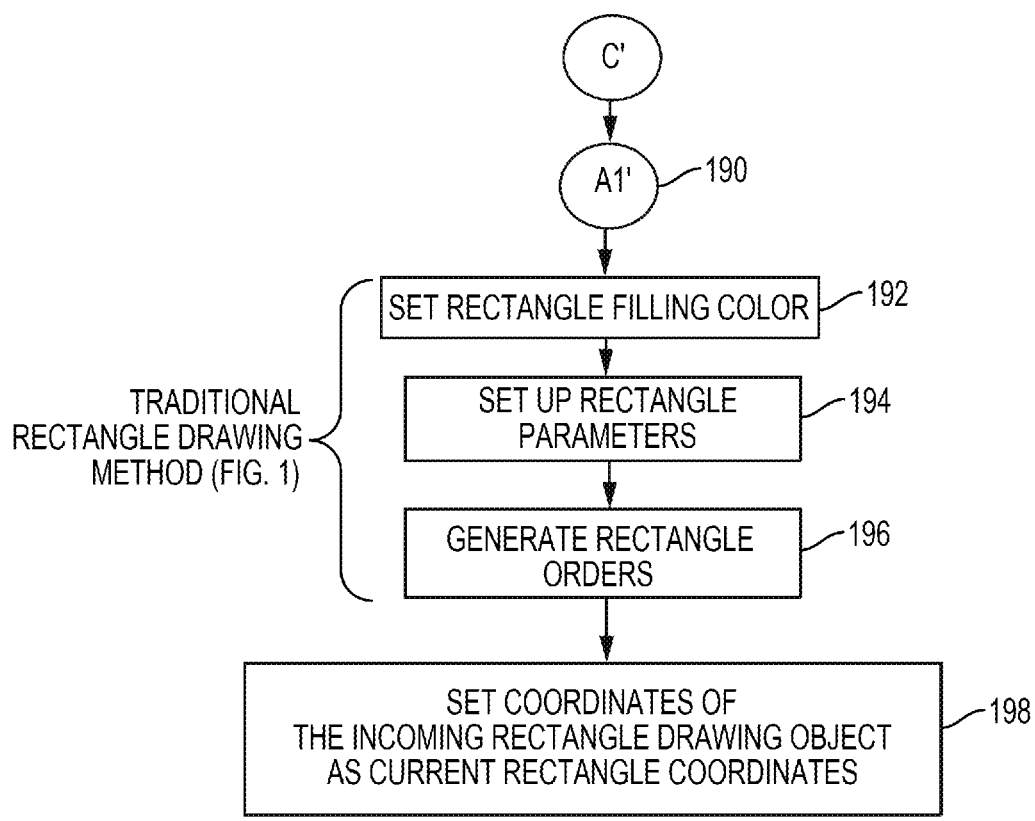
FIG. 14 is a flow chart depicting an alternative to the process of FIG. 13.

FIGS. 12-14 (with corresponding sets of steps 160-172 (FIG. 12), 180-186 (FIG. 13), and 190-198 (FIG. 14)) are flowcharts similar to FIGS. 9-11 but correspond to the vertical case, as shown in FIG. 5, where one-line raster image is generated in the vertical direction and is used along the horizontal direction. Hence, detailed description of those figures will be omitted. However, for the vertical case, the predetermined condition is assumed to be as described in connection with FIG. 5. Also, unlike the horizontal case of FIG. 4, at step 168 of FIG. 12, the filling color of the incoming rectangle drawing object is rendered to a one-line raster image over an extent corresponding to a height of the incoming rectangle drawing object in the vertical direction, e.g., an extent from Y2 to Y3 along the y-axis, as shown in FIG. 5. More specifically, raster image data is generated and stored in the one-line raster image buffer 32, where the raster image data includes pixel color data for each of the pixels over the extent corresponding to the height (e.g., from Y2 to Y3, as in FIG. 5).

Figure 17A:
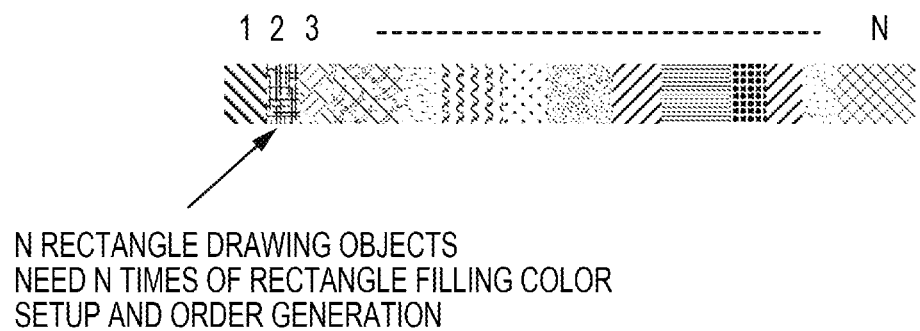
FIG. 17A illustrates an example of rectangle color filling setup and order generation for N rectangle drawing objects in accordance with a prior art rectangle rendering method.
Figure 17B:
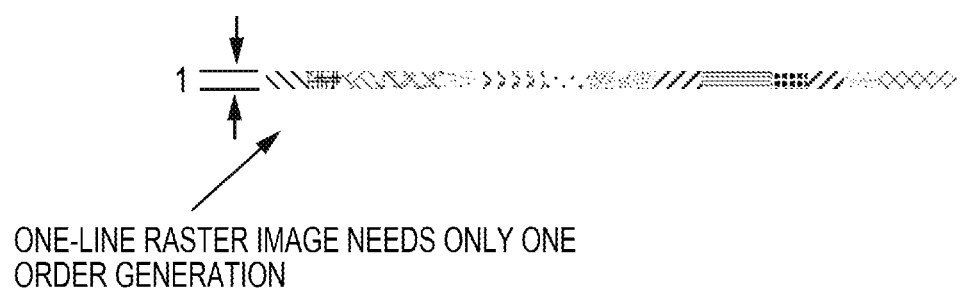
FIG. 17B illustrates an example of rectangle color filling setup and order generation for N rectangle drawing objects in accordance with an example embodiment.

With the benefit of the present disclosure, instead of multiple rectangle order generations and rectangle filling color setups, only a single, or one-time, one-line raster order generation is needed, as pictorially depicted in FIG. 17B. More specifically, as shown in FIG. 17A, with a traditional rectangle rendering method, N rectangle drawing objects would need N times of rectangle color filling setup and order generation since a rectangle filling color setup and order generation processing would have to be carried out for each of the N rectangle drawing objects individually.

In contrast, with a method of the present disclosure, as shown in FIG. 17B, a one-line raster image associated with multiple rectangle drawing objects can be generated by performing order generation only once. Further, since raster image data already carries color information, rectangle color filling setup normally associated with vector drawing objects is not necessary. Subsequently, the one-line raster image (or, more particularly, one-line raster image data corresponding to the one-line raster image) may be used one or more times to render the multiple rectangle drawing objects in their entirety, as explained above.

Additionally, with a benefit of the present disclosure, when generating one-line raster image data for rectangle drawing objects that are overlapping each other, an overlapped part of the rectangle drawing objects is generated for the one-line raster image, and hence the rest of the overlapped part needs to be drawn only once instead of multiple times.

Figure 18C:
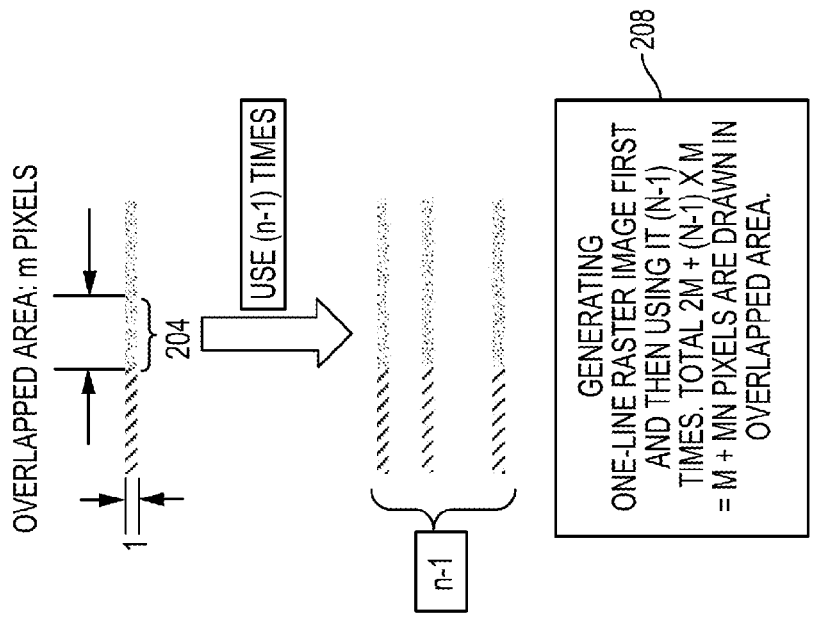
FIG. 18C illustrates a one-line raster image that is generated for the two rectangle drawing objects of FIG. 18A and used in accordance with a method of the present disclosure.
Figure 18B:
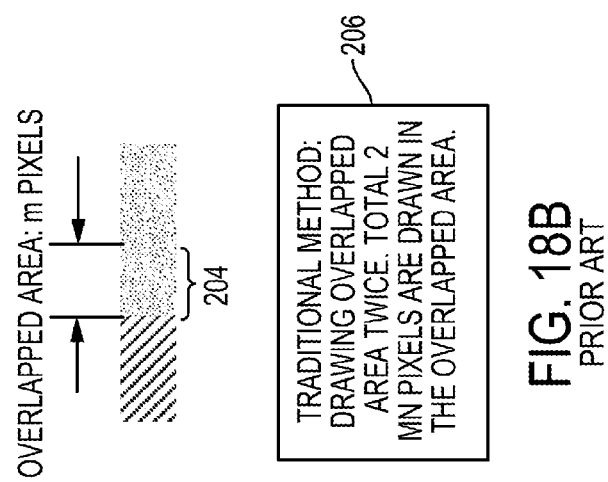
FIG. 18B illustrates an example of drawing an overlap area of the two rectangle drawing objects of FIG. 18A in accordance with a prior art rectangle rendering method.
Figure 18A:
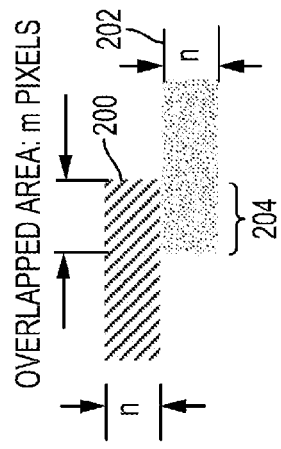
FIG. 18A illustrates an example of two rectangle drawing objects that overlap.
Figure 19:
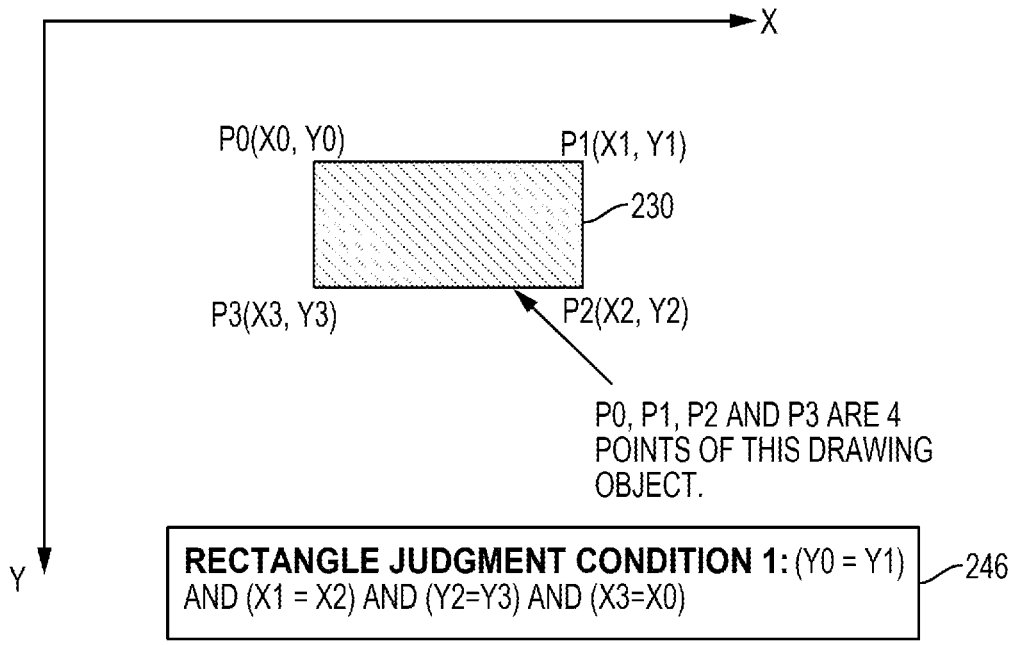
FIGS. 19-26 illustrate various examples of how a determination of whether a drawing object is a rectangle drawing object may be carried out, in accordance with an example embodiment.
Figure 20:
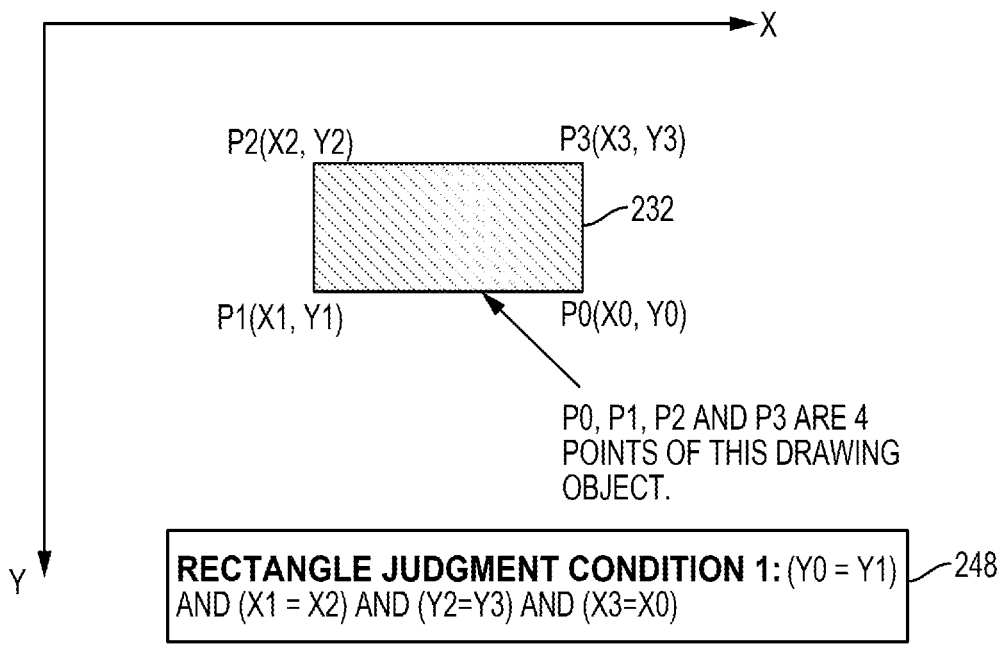
Figure 21:
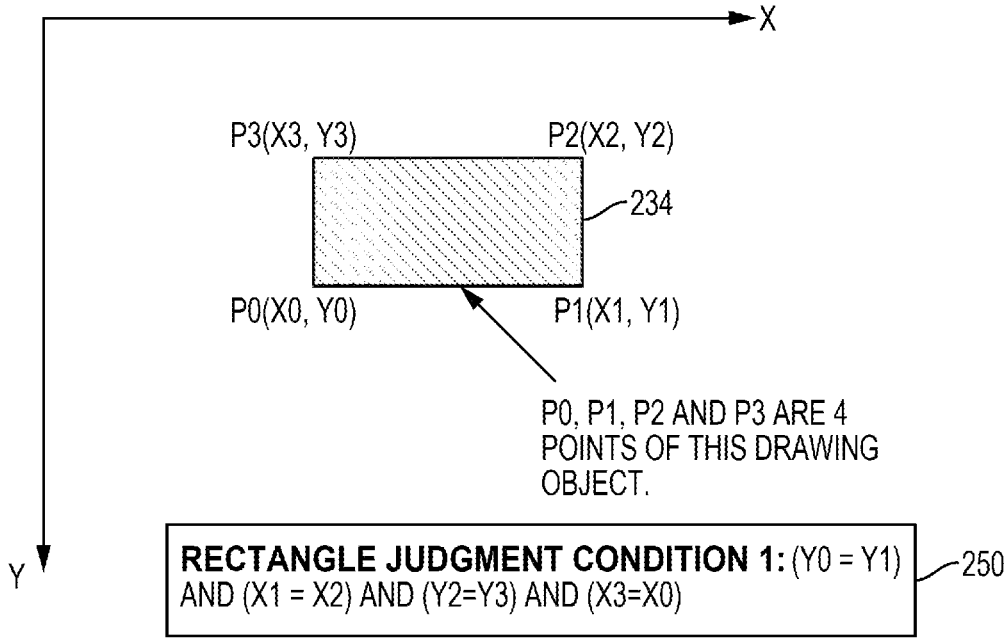
Figure 22:
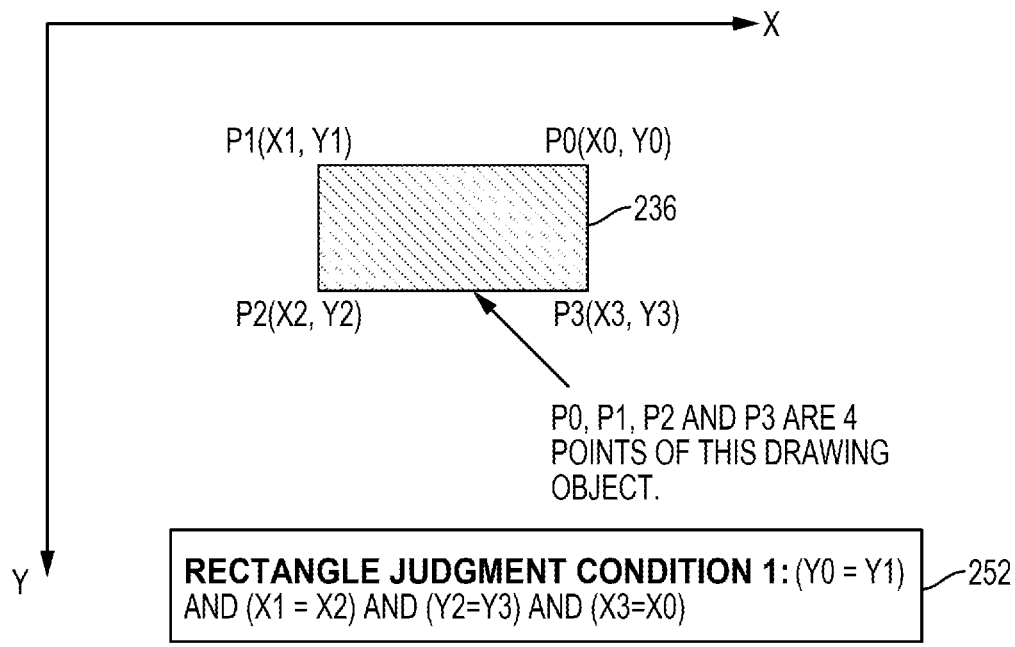
Figure 23:
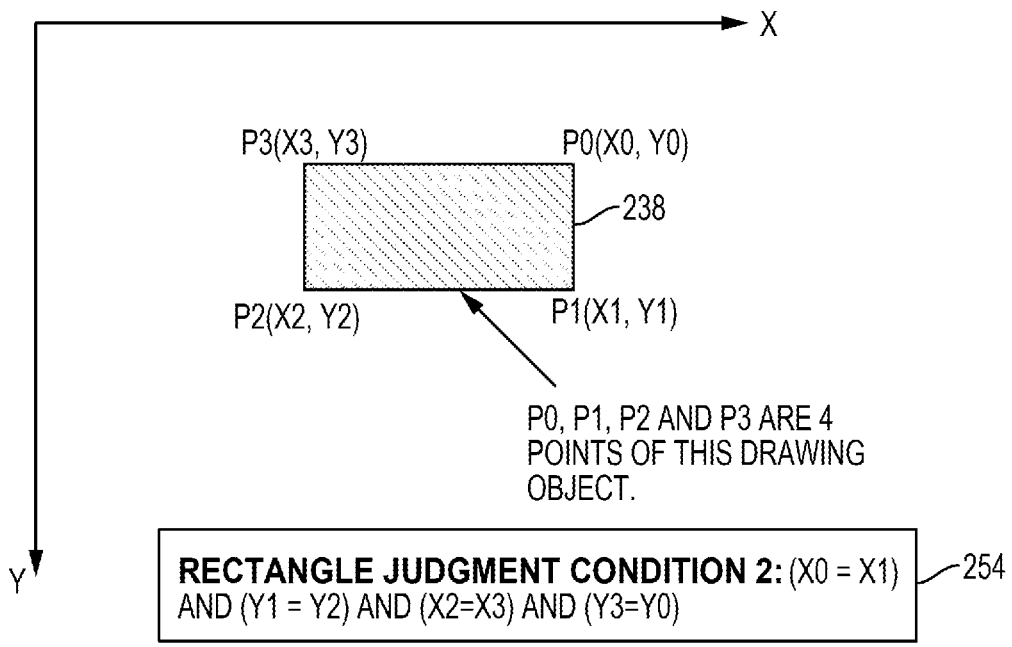
Figure 24:
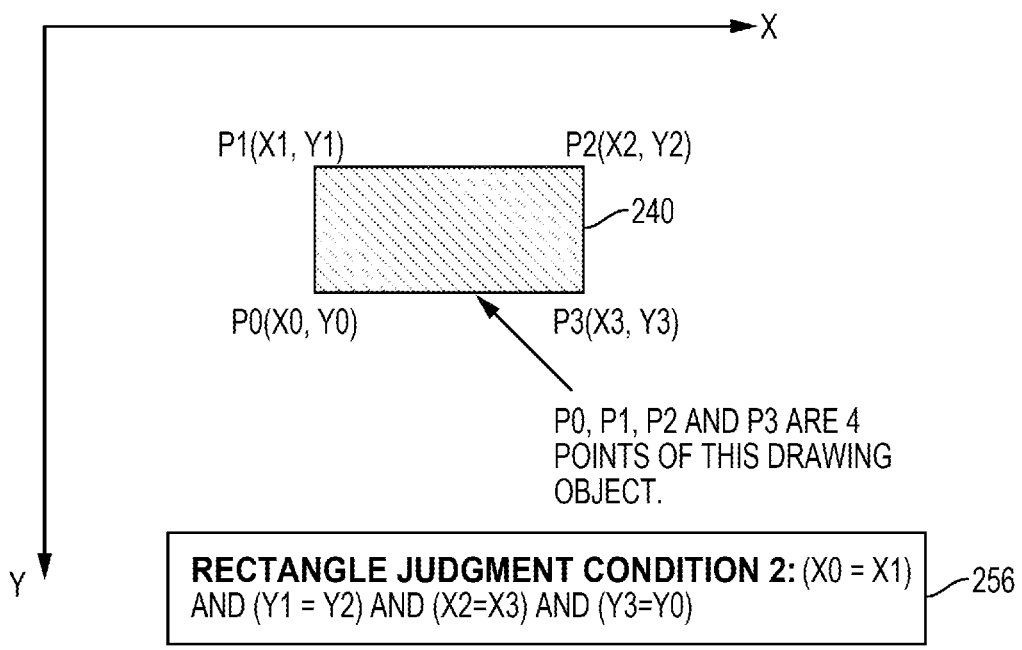
Figure 25:
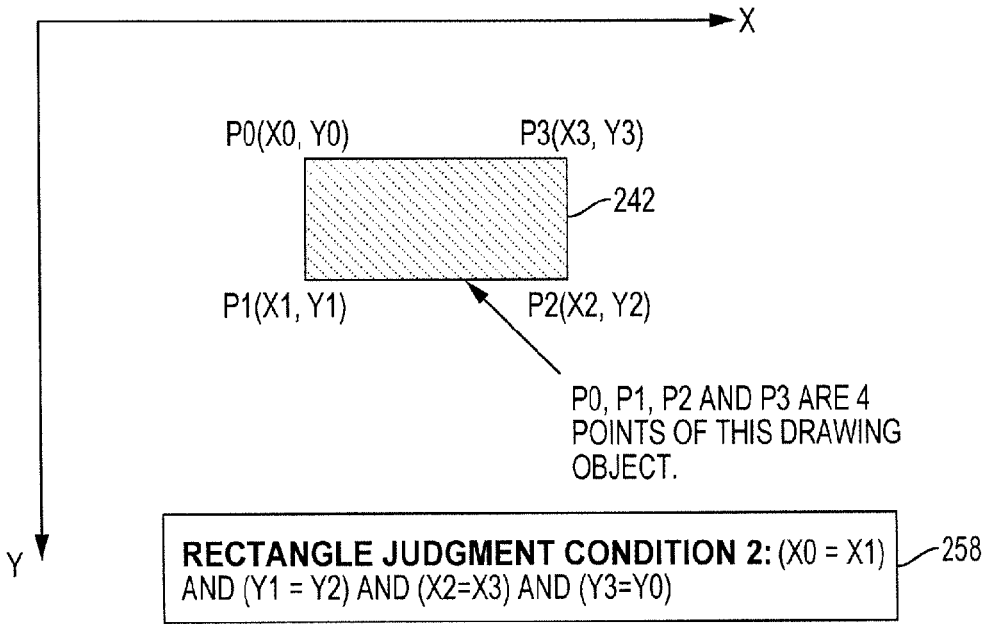
Figure 26:
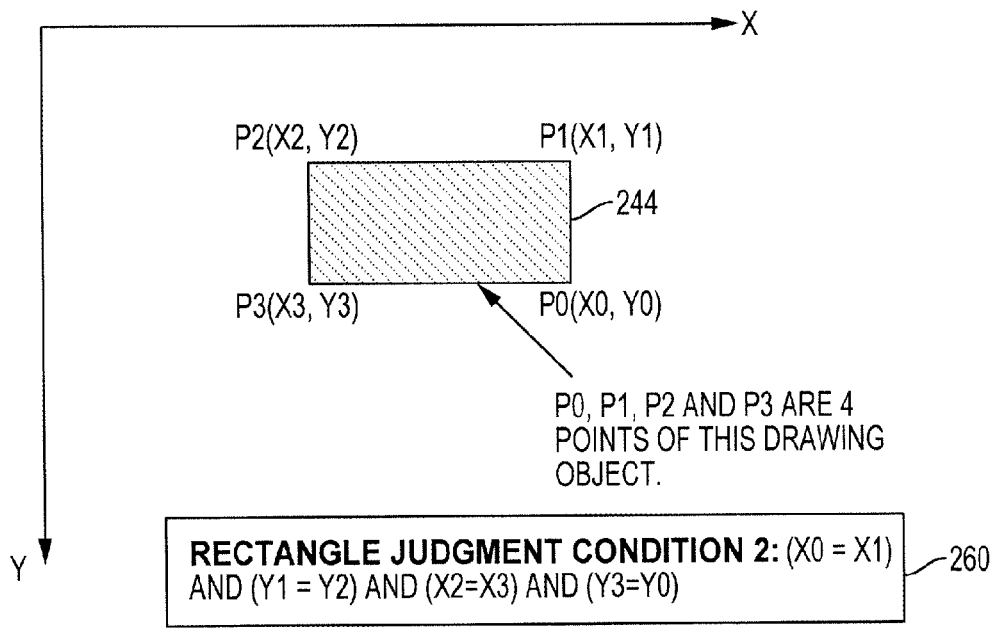

To illustrate, FIG. 18A shows a case of two overlapping rectangle drawing objects 200 and 202 that meet a predetermined condition, such as the predetermined condition of FIG. 4. As shown in FIG. 18A, it is assumed that each of the rectangle drawing objects 200 and 202 has a height of n pixels. Further, an overlap area 204, or an area of where the two rectangle drawing objects 200 and 202 overlap each other, has a width of m pixels. In a traditional rectangle rendering method, as depicted in FIG. 18B (refer to box 206), the overlap area 204 would be drawn twice, i.e., once for each of the two rectangle drawing objects 200 and 202. As a result, a total of 2mn pixels would need to be drawn in the overlapped area, i.e., an area of mn pixels would have to be drawn for the rectangle drawing object 200, and then another area of mn pixels would have to be separately drawn for the rectangle drawing object 202. Hence, the total of 2mn pixels would be effectively drawn.

In contrast, with a method of the present disclosure, a one-line raster image is generated first for the two rectangle drawing objects of FIG. 18A, and then this one-line raster image is used (n−1) times (e.g., over a height extent), as shown in FIG. 18C (refer to box 208). In effect, a total of (2m+(n−1)*m, or (m+mn) pixels are drawn in the overlap area 204. Effectively, a number of pixels drawn in the overlap area is reduced in comparison to the traditional rectangle rendering method as in FIG. 18B.

Further, the present disclosure can improve processing speed because of reduced processes of generating intermediate commands (order-list), color conversion, and halftoning. This is because a plurality of rectangle drawing objects are rendered into one-line raster image, and generating of intermediate commands, color conversion, and halftoning needs to be done only one time instead of performing those processes multiple times for every single rectangle drawing object in the plurality of rectangle drawing objects.

3. Working Example

Figure 27A:
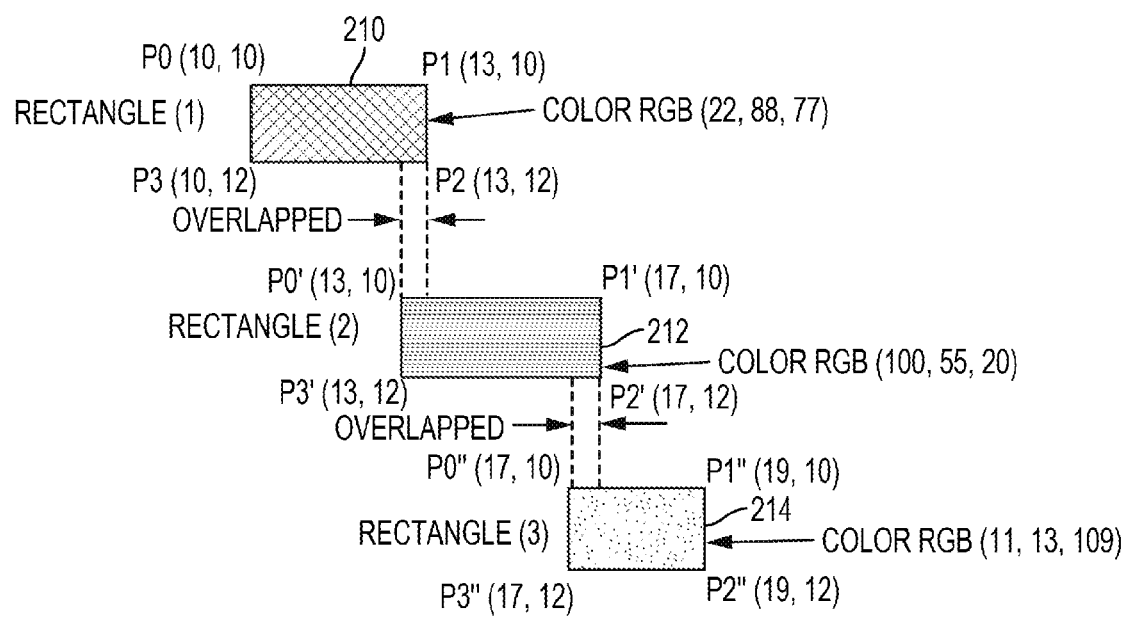
FIG. 27A illustrates a group of three rectangle drawing objects that are to be rendered, in accordance with an example embodiment.

FIG. 27A illustrates a group of three rectangle drawing objects 210, 212, and 214 that are to be rendered using various processes described above. As depicted in FIG. 27A, the rectangle drawing object 210 (denoted as "Rectangle (1)") has four points P0-P3 with their respective (X,Y) coordinates, the rectangle drawing object 212 (denoted as "Rectangle (2)") has four points P0'-P3' with their respective X,Y coordinates, and the rectangle drawing object 214 (denoted as "Rectangle (3)") has four points P0"-P3" with their respective (X,Y) coordinates. In this example, a filling color for each respective rectangle drawing object is defined by a corresponding set of RGB data, as shown in FIG. 27A. As further shown, the rectangle drawing object 212 overlaps the rectangle drawing object 210. In turn, the rectangle drawing object 214 overlaps the rectangle drawing object 212. The present example assumes that each coordinate point corresponds to a single pixel such that a width of Rectangle (1) is four (4) pixels (X-coordinate from 10 to 13, inclusive), the width of Rectangle (2) is five (5) pixels (X-coordinate from 13 to 17, inclusive), and the width of Rectangle (3) is three (3) pixels (X-coordinate from 17 to 19, inclusive).

Figure 27B:
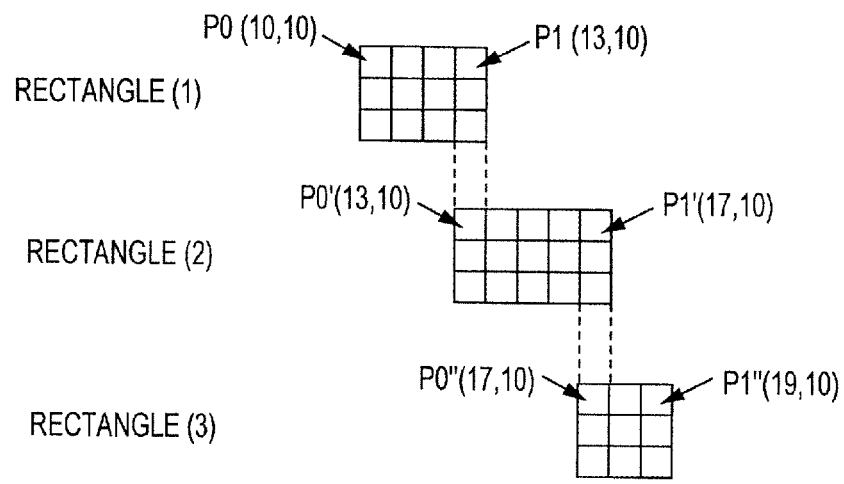
FIG. 27B illustrates the rectangle drawing objects of FIG. 27A in greater detail.

Note that in the present example, the (X,Y) coordinates of each of the rectangle drawing objects 210-214 correspond to integer coordinates of a given image forming apparatus, such as image forming apparatus 20. This is pictorially depicted in FIG. 27B.

Figure 28A:
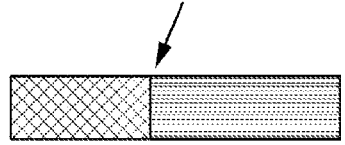
FIGS. 28A-F illustrate how the rectangle drawing objects of FIG. 27A are rendered using the processes of FIGS. 6, 7, and 9.
Figure 28A:
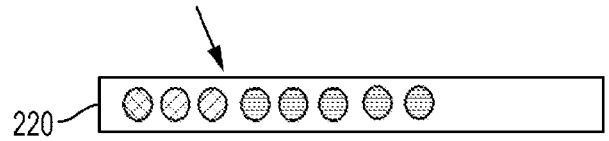
Figure 28B:

FIGS. 28A-F show a state of a one-line raster image as the three rectangle drawing objects 210-214 are rendered using various processes described herein. In FIG. 28A, a one-line raster image 220 associated with Rectangles (1) and (2) (also denoted as "currently rendered one-line raster image," in FIG. 28A) is generated and a current rectangle drawing object (referred to as "current rectangle") is obtained by merging coordinates of Rectangle (1) and Rectangle (2) (see steps 124, 128, and 130 in FIG. 9). In FIG. 28B, after rendering Rectangle (1) and the Rectangle (2) to the one-line raster image 220, an incoming drawing object, i.e., the Rectangle (3) is received. Once received, a determination is made as to whether the incoming drawing object is a rectangle drawing object (see step 76 in FIG. 6). If it is, it is determined if Rectangle (3) satisfies a predetermined condition (e.g., the predetermined condition as in FIG. 4) with respect to the current rectangle obtained by merging Rectangles (1) and (2) (see step 122 in FIG. 9).

Figure 28C:
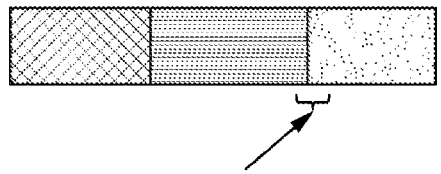
Figure 28D:
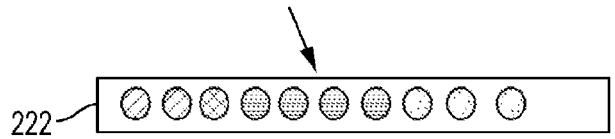
Figure 28D:
Figure 28E:
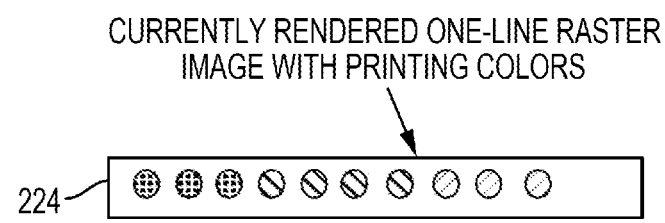
Figure 28F:
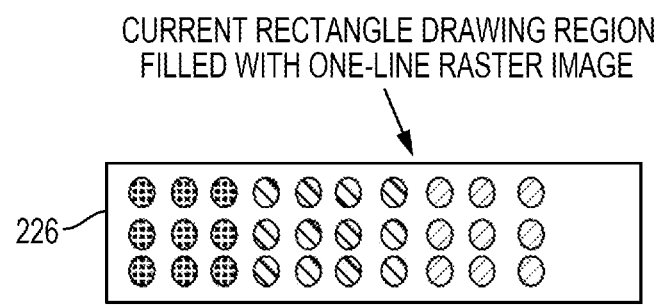

In the present example, for instance, as shown in FIG. 28C, (i) incoming Rectangle (3) and the current rectangle are parallel with the x-axis, (ii) a height of Rectangle (3) is equal to a height of the current rectangle, (iii) Y coordinates of Rectangle (3) and the current rectangle are the same, and (iv) in the x-axis direction, Rectangle (3) overlaps the current rectangle. Since the predetermined condition is satisfied, in FIG. 28D, the filling color of Rectangle 3 is obtained (see step 124 in FIG. 9) and rendered to the one-line raster image over an extent corresponding to the width of Rectangle (3) in the horizontal direction, such as from the X coordinate of 17 to the X coordinate of 19 along the x-axis (see step 128 in FIG. 9). In this regard, as shown in FIG. 28D, one-line raster image data associated with Rectangles (1) and (2) in a one-line raster image buffer (e.g., the one-line raster image buffer 32) is merged with one-line raster image data associated with Rectangle (3) to generate a one-line raster image 222 for Rectangles (1), (2), and (3) (also denoted as "currently rendered one-line raster image," in FIG. 28D). Subsequently, an updated current rectangle is obtained by merging coordinates of Rectangle (1), Rectangle (2), and Rectangle (3) (see step 130 in FIG. 9). Note that, as shown in FIG. 28D, the present example assumes that in an area of overlap, a color of overlapping pixels will correspond to rectangle filling color of a rectangle drawing object processed last.

As shown at step 86 of FIG. 6, once the process of rendering the rectangle drawing object is completed, a decision is made as to whether there is still another drawing object to be processed. Assuming that there is not another drawing object, then the process A1 shown in FIG. 7 is executed (see step 88 in FIG. 6). Namely, in FIG. 28E, if a determination is made that there is holding of a one-line raster image, one-line raster image pixel colors are converted to printing colors to produce one-line printing image data corresponding to a one-line raster image with printing colors 224 (also denoted as "currently rendered one-line raster image with printing colors," in FIG. 28E) (see steps 100 and 102 in FIG. 7). Then, in FIG. 28F, rectangle orders are generated by using the one-line printing image data to fill a rectangle drawing region 226 (also denoted as "current rectangle drawing region filled with one-line raster image," in FIG. 28F) whose height is equal to a height of Rectangle (3). As explained above, the generated orders represent printing commands that will specify a number of times that the one-line printing image data will need to be used over an extent corresponding to the height to fill the rectangle drawing region.

5. Conclusion

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method for rendering rectangle drawing objects, comprising:
   receiving, by at least one processor, print data including data representing a plurality of rectangle drawing objects, the plurality of rectangle drawing objects including at least a first rectangle drawing object and a second rectangle drawing object;
   determining, by the at least one processor, if the second rectangle drawing object satisfies a predetermined condition with respect to the first rectangle drawing object;
   if the predetermined condition is satisfied, generating, by the at least one processor, one-line raster image data associated with the second rectangle drawing object and storing, by the at least one processor, the one-line raster image data in a data buffer, wherein the one-line raster image data indicates a filling color of the second rectangle drawing object over a first extent in a first direction, the first extent corresponding to a first parameter of the second rectangle drawing object;
   using, by the at least one processor, the one-line raster image data a number of times over a second extent in a second direction perpendicular to the first direction to fill a drawing region corresponding to at least the second rectangle drawing object, the second extent corresponding to a second parameter of the second rectangle drawing object;
   producing, by the at least one processor, one-line printing image data based on the one-line raster image data; and
   printing, by the at least one processor, at least the second rectangle drawing object using the one-line printing image data.

2. The method of claim 1, further comprising:
   using, by the at least one processor, the one-line printing image data to generate orders specifying the number of times the one-line printing image data is to be used to fill the drawing region.

3. The method of claim 2, wherein the drawing region is filled with halftoned data generated from the one-line printing image data.

4. The method of claim 2, wherein the filling color is represented by pixel color data associated with the one-line raster image data, and the pixel color data is converted to a printing color to produce the one-line printing image data.

5. The method of claim 1, wherein the first extent corresponds to a given number of pixels, and the one-line raster image data includes color data for each of the given number of pixels for a single raster image line that is one-pixel wide.

6. The method of claim 1, further comprising:
   prior to determining if the second rectangle drawing object satisfies the predetermined condition with respect to the first rectangle drawing object, generating, by the at least one processor, a first one-line raster image data associated with the first rectangle drawing object and storing, by the at least one processor, the first one-line raster image data in the data buffer, wherein the first one-line raster image data indicates a filling color of the first rectangle drawing object over a third extent in the first direction, the third extent corresponding to a third parameter of the first rectangle drawing object, and the first rectangle drawing object having a fourth parameter extending in the second direction; and merging, by the at least one processor, the one-line raster image data associated with the second rectangle drawing object with the first one-line raster image data in the data buffer to generate a merged one-line raster image data associated with the first and second rectangle drawing objects, wherein the fourth parameter of the first rectangle drawing object is equal to the second parameter of the second rectangle drawing object.

7. The method of claim 6, wherein using the one-line raster image data includes using the merged one-line raster image data the number of times over the second extent in the second direction perpendicular to the first direction, the second extent corresponding to the second parameter of the second rectangle drawing object that is equal to the fourth parameter of the first rectangle drawing object.

8. The method of claim 6, wherein the merged one-line raster image data is used the number of times until a drawing region corresponding to the first and second rectangle drawing objects is filled.

9. The method of claim 1, wherein the first rectangle drawing object is rendered without generating one-line raster image data associated with the first rectangle drawing object.

10. The method of claim 1, wherein the predetermined condition holds that:
(i) the first and second rectangle drawing objects are parallel with respect to the first direction,
(ii) along the second direction, a position of the second rectangle drawing object is the same as a position of the first rectangle drawing object,
(iii) along the second direction, a length of the second rectangle drawing object is equal to a length of the first rectangle drawing object, and
(iv) in the first direction, the second rectangle drawing object is connected to the first rectangle drawing object or overlaps the first rectangle drawing object.

11. The method of claim 1, wherein:
the first direction is defined as a horizontal direction,
the second direction is defined as a vertical direction,
the first parameter is defined as a width, the width extending in the horizontal direction, and
the second parameter is defined as a height, the height extending in the vertical direction.

12. The method of claim 11, wherein the first direction is defined by a first axis and the second direction is defined by a second axis orthogonal to the first axis, and the predetermined condition holds that:
(i) the first and second rectangle drawing objects are parallel with the first axis,
(ii) a position of the second rectangle drawing object along the second axis is the same as a position of the first rectangle drawing object along the second axis,
(iii) a height of the second rectangle drawing object is equal to a height of the first rectangle drawing object, and
(iv) in the first direction, the second rectangle drawing object is connected to the first rectangle drawing object.

13. The method of claim 11, wherein the first direction is defined by a first axis and the second direction is defined by a second axis orthogonal to the first axis, and the predetermined condition holds that:
(i) the first and second rectangle drawing objects are parallel with the first axis,
(ii) a position of the second rectangle drawing objects along the second axis is the same as a position of the first rectangle drawing object along the second axis,
(iii) a height of the second rectangle drawing object is equal to a height of the first rectangle drawing object, and
(iv) in the first direction, the second rectangle drawing object overlaps first rectangle drawing object.

14. The method of claim 1, wherein:
the first direction is defined as a vertical direction,
the second direction is defined as a horizontal direction,
the first parameter is defined as a height, the height extending in the vertical direction, and
the second parameter is defined as a width, the width extending in the horizontal direction.

15. The method of claim 14, wherein the first direction is defined by a first axis and the second direction is defined by a second axis orthogonal to the first axis, and the predetermined condition holds that:
(i) the first and second rectangle drawing objects are parallel with the first axis,
(ii) a position of the second rectangle drawing objects along the second axis is the same as a position of the first rectangle drawing object along the second axis,
(iii) a width of the second rectangle drawing object is equal to a width of the first rectangle drawing object, and
(iv) in the first direction, the second rectangle drawing object is connected to the first rectangle drawing object.

16. The method of claim 14, wherein the first direction is defined by a first axis and the second direction is defined by a second axis orthogonal to the first axis, and the predetermined condition holds that:
(i) the first and second rectangle drawing objects are parallel with the first axis,
(ii) a position of the second rectangle drawing objects along the second axis is the same as a position of the first rectangle drawing object along the second axis,
(iii) a width of the second rectangle drawing object is equal to a width of the first rectangle drawing object, and
(iv) in the first direction, the second rectangle drawing object overlaps the first rectangle drawing object.

17. The method of claim 1, further comprising:
analyzing, by the at least one processor, a drawing object in the received print data to determine if the drawing object is a rectangle drawing object.

18. A method for rendering rectangle drawing objects, comprising:
receiving, by at least one processor, print data including data representing a plurality of rectangle drawing objects, the plurality of rectangle drawing objects including at least a first rectangle drawing object, a second rectangle drawing object, and a third rectangle drawing object;
determining, by the at least one processor, if the second rectangle drawing object satisfies a predetermined condition with respect to the first rectangle drawing object;
if the predetermined condition is satisfied, generating, by the at least one processor, a first one-line raster image data associated with the second rectangle drawing object and storing, by the at least one processor, the first one-line raster image data in a one-line raster image data buffer, wherein the first one-line raster image data indicates a filling color of the second rectangle drawing object over a first extent in a first direction, the first extent corresponding to a first parameter of the second rectangle drawing object;

determining, by the at least one processor, if the third rectangle drawing object satisfies the predetermined condition with respect to the second rectangle drawing object;

if the predetermined condition is satisfied, generating, by the at least one processor, a second one-line raster image data associated with the third rectangle drawing object and merging, by the at least one processor, the second one-line raster image data with the first one-line raster image data in the data buffer to generate a merged one-line raster image data, wherein the second one-line raster image data indicates a filling color of the third rectangle drawing object over a second extent in the first direction, the second extent corresponding to a second parameter of the second rectangle drawing object;

using, by the at least one processor, the merged one-line raster image data a number of times along a second direction perpendicular to the first direction to fill a drawing region corresponding to at least the second and third rectangle drawing objects;

producing, by the at least one processor, one-line printing image data based on the merged one-line raster image data; and printing, by the at least one processor, at least one of the second rectangle drawing object and the third drawing object using the one-line printing image data.

19. The method of claim 18, wherein the predetermined condition holds that:
  (i) two rectangle drawing objects are parallel with respect to the first direction,
  (ii) along the second direction, a position of one of the two rectangle drawing objects is the same as a position of another one of the two rectangle drawing objects,
  (iii) along the second direction, the two rectangle drawing objects have an equal length, and
  (iv) in the first direction, the two rectangle drawing objects are connected or overlap each other.

20. The method claim 18, further comprising:
  prior to using the merged one-line raster image data, determining, by the at least one processor, if the merged one-line raster image data is to be used.

21. The method of claim 20, wherein:
  the plurality of rectangle drawing objects further includes a fourth rectangle drawing object, and
  the merged one-line raster image is to be used when the fourth rectangle drawing object does not satisfy the predetermined condition with respect to at least the third rectangle drawing object.

22. The method of claim 18, wherein the method further comprises:
  performing, by the at least one processor, a one-time order generation to fill the drawing region using the one-line printing image data produced based on the merged one-line raster image data.

23. The method of claim 22, further comprising:
  converting, by the at least one processor, pixel colors corresponding to the merged one-line raster image data to printing colors to produce the one-line printing image data, the pixel colors corresponding to the filling colors of the second and third rectangle drawing objects.

24. A method for rendering rectangle drawing objects, comprising:
  receiving, by at least one processor, print data including data representing a plurality of rectangle drawing objects, the plurality of rectangle drawing objects including at least a first rectangle drawing object, a second rectangle drawing object, and a third rectangle drawing object;
  generating, by the at least one processor, a first one-line raster image data associated with the first rectangle drawing object and storing, by the at least one processor, the first one-line raster image data in the data buffer, wherein the first one-line raster image data indicates a first filling color of the first rectangle drawing object over a first extent in a first direction;
  determining, by the at least one processor, if the second rectangle drawing object satisfies a predetermined condition with respect to the first rectangle drawing object;
  if the predetermined condition is satisfied, generating, by the at least one processor, a second one-line raster image data associated with the second rectangle drawing object and merging, by the at least one processor, the second one-line raster image data with the first one-line raster image data in the data buffer to generate a first merged one-line raster image data, wherein the second one-line raster image data indicates a second filling color of the second rectangle drawing object over a second extent in the first direction;
  merging, by the at least one processor, the first rectangle drawing object with the second rectangle drawing object to obtain a current rectangle drawing object;
  determining, by the at least one processor, if the third rectangle drawing object satisfies the predetermined condition with respect to the current rectangle drawing object; and
  if the predetermined condition is satisfied, generating, by the at least one processor, a third one-line raster image data associated with the third rectangle drawing object and merging, by the at least one processor, the third one-line raster image data with the first merged one-line raster image data in the data buffer to generate a second merged one-line raster image data, wherein the third one-line raster image data indicates a filling color of the third rectangle drawing object over a third extent in the first direction;
  producing, by the at least one processor, one-line printing image data based on the second merged one-line raster image data; and
  printing, by the at least one processor, at least one of the second rectangle drawing object and the third drawing object using the one-line printing image data.

25. The method of claim 24, further comprising:
  merging, by the at least one processor, the current drawing object with the third rectangle drawing object to obtain an updated current rectangle drawing object;
  determining, by the at least one processor, if an incoming drawing object in the print data is a rectangle drawing object; and
  if the incoming drawing object is not the rectangle drawing object, using, by the at least one processor, the second merged one-line raster image data a number of times along a second direction perpendicular to the first direction to fill a drawing region corresponding to the updated current rectangle drawing object.

26. An apparatus for rendering rectangle drawing objects, comprising:
- at least one processor;
- memory; and
- program instructions that are stored in the memory and, when executed by the at least one processor, cause the at least one processor to perform functions including:
  - receiving print data including data representing a plurality of rectangle drawing objects, the plurality of rectangle drawing objects including at least a first rectangle drawing object and a second rectangle drawing object;
  - determining if the second rectangle drawing object satisfies a predetermined condition with respect to the first rectangle drawing object;
  - if the predetermined condition is satisfied, generating one-line raster image data associated with the second rectangle drawing object and storing the one-line raster image data in a data buffer, wherein the one-line raster image data indicates a filling color of the second rectangle drawing object over a first extent in a first direction, the first extent corresponding to a first parameter of the second rectangle drawing object;
  - using the one-line raster image data a number of times over a second extent in a second direction perpendicular to the first direction to fill a drawing region corresponding to at least the second rectangle drawing object, the second extent corresponding to a second parameter of the second rectangle drawing object;
  - producing one-line printing image data based on the one-line raster image data; and
  - printing at least the second rectangle drawing object using the one-line printing image data.

* * * * *